(12) United States Patent
Ito

(10) Patent No.: US 8,917,236 B2
(45) Date of Patent: Dec. 23, 2014

(54) STORAGE MEDIUM HAVING INFORMATION PROCESSING PROGRAM STORED THEREIN, INFORMATION PROCESSING APPARATUS, AND INFORMATION PROCESSING SYSTEM

(75) Inventor: Jun Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 366 days.

(21) Appl. No.: 12/709,752

(22) Filed: Feb. 22, 2010

(65) Prior Publication Data

US 2011/0169737 A1 Jul. 14, 2011

(30) Foreign Application Priority Data

Jan. 12, 2010 (JP) ................................. 2010-003860

(51) Int. Cl.
*G06F 3/0484* (2013.01)
*G06F 3/03* (2006.01)
*G06F 3/0346* (2013.01)
*G06F 3/038* (2013.01)

(52) U.S. Cl.
CPC .......... *G06F 3/04845* (2013.01); *G06F 3/0304* (2013.01); *G06F 3/0346* (2013.01); *G06F 3/038* (2013.01); *A63F 2300/105* (2013.01); *A63F 2300/6045* (2013.01)
USPC ........... 345/156; 375/157; 375/158; 375/159; 375/160; 375/161; 375/162; 375/163; 375/166; 715/702; 715/863; 715/864; 715/865; 715/886; 715/784

(58) Field of Classification Search
USPC ............................ 345/158, 156; 715/863, 784
See application file for complete search history.

(56) References Cited

U.S. PATENT DOCUMENTS

| | | | |
|---|---|---|---|
| 2006/0019614 A1* | 1/2006 | Yamasaki | 455/90.2 |
| 2007/0060228 A1 | 3/2007 | Akasaka et al. | |
| 2007/0191112 A1 | 8/2007 | Ohta | |
| 2008/0151125 A1* | 6/2008 | Bucchieri | 348/734 |
| 2009/0066647 A1* | 3/2009 | Kerr et al. | 345/158 |
| 2009/0322676 A1* | 12/2009 | Kerr et al. | 345/158 |
| 2010/0037261 A1* | 2/2010 | Ohta et al. | 725/40 |
| 2010/0039381 A1* | 2/2010 | Cretella et al. | 345/158 |

FOREIGN PATENT DOCUMENTS

| | | |
|---|---|---|
| JP | 2006-209563 | 8/2006 |
| JP | 2007-61489 | 3/2007 |
| JP | 2007-213144 | 8/2007 |
| JP | 2009-251702 | 10/2009 |
| WO | 2009/023786 | 2/2009 |
| WO | 2009/148444 | 12/2009 |

* cited by examiner

*Primary Examiner* — Grant Sitta
*Assistant Examiner* — Amen Bogale
(74) *Attorney, Agent, or Firm* — Nixon & Vanderhye PC

(57) ABSTRACT

An information processing apparatus is capable of obtaining operation data according to a tilt of a predetermined object that can be moved by a user. The information processing apparatus calculates tilt information corresponding to the tilt of the object based on the operation data. The information processing apparatus calculates a specified position on a screen of a display device based on the operation data so that the specified position changes according to at least one of a position and the tilt of the object. Selection items are displayed on the screen of the display device. The information processing apparatus switches between sets of the selection items displayed on the screen according to an amount of tilt represented by the tilt information. Moreover, the information processing apparatus selects an item displayed at the specified position from among the selection items to perform an information process according to the selected item.

26 Claims, 16 Drawing Sheets

STORAGE MEDIUM HAVING INFORMATION PROCESSING PROGRAM STORED THEREIN, INFORMATION PROCESSING APPARATUS, AND INFORMATION PROCESSING SYSTEM

CROSS REFERENCE TO RELATED APPLICATION

The disclosure of Japanese Patent Application No. 2010-3860, filed Jan. 12, 2010, is incorporated herein by reference.

BACKGROUND

1. Field

Example embodiments of the present invention relate to a storage medium having an information processing program stored therein, an information processing apparatus, and an information processing system and, more particularly, to a storage medium having an information processing program stored therein, an information processing apparatus, and an information processing system, with which the user can select a selection item displayed on the screen.

2. Description of the Background Art

In the prior art, there is an information processing system in which the user can perform an operation of selecting an item from among a plurality of selection items displayed on the screen by using an input device that the user can hold in hand and perform an operation of moving around the input device itself, as described in Japanese Laid-Open Patent Publication No. 2007-213144 (Patent Document 1), for example. In this information processing system, a game apparatus selects an item from among a plurality of selection items displayed on the screen based on the position on the screen being pointed by the input device and on an operation on a button provided on the input device (whether the button is pressed).

In the information processing system of Patent Document 1, items from which the user can make a selection are all displayed within a single screen. Therefore, where there are many selection items, each item is displayed to be small, making it difficult to select a selection item. Thus, a system that employs an input method where a position on the screen is specified by the player moving around an input device (or another object) has a problem in that it becomes difficult to perform the selection operation when many selection items are displayed within a single screen.

SUMMARY

Example embodiments of the present invention provide an information processing apparatus that employs an input method where a position on the screen is specified by the player moving around an input device or another object, with an input interface that makes it easy to perform the operation of selecting an item from among selection items.

Example embodiments of the present invention employ configurations (1) to (14) below to attain the object mentioned above.

(1)

Example embodiments of the present invention are directed to a computer-readable storage medium having stored therein an information processing program to be executed by a computer in an information processing apparatus capable of obtaining operation data according to a tilt of a predetermined object that can be moved by a user. The information processing program causes the computer to function as a tilt calculation section, a position calculation section, a display control section, a switching section, and a selecting section. The tilt calculation section calculates tilt information corresponding to the tilt of the object based on the operation data. The position calculation section calculates a specified position on a screen of a display device based on the operation data so that the specified position changes according to at least one of a position and the tilt of the object. The display control section displays selection items on the screen of the display device. The switching section switches between sets of the selection items displayed on the screen according to an amount of tilt represented by the tilt information. The selecting section selects an item displayed at the specified position from among the selection items to perform an information process according to the selected item.

The "predetermined object" may be any object that can be moved by the user, and is a concept that includes an input device as set forth in (4) or (8) below, a marker as set forth in (7) below, or a part of the body of the user.

The "operation data according to a tilt of a predetermined object" may be any data based on which the tilt of the predetermined object can be calculated, and is a concept that includes data that changes according to the tilt of the predetermined object, and data that changes according to a change of the tilt of the predetermined object.

The "tilt information corresponding to the tilt of the object" may be any information representing a tilt according to the tilt of the object, and it may be information representing the tilt of the object itself or information representing the tilt of another object whose tilt changes according to the tilt of the object (e.g., an object placed in the virtual space).

The "selection item" may be an image associated with a particular process, or a partial area within an area displayed on the screen. An "image associated with a particular process" includes, for example, an icon image, an image of a game item or a game character, an image of a letter representing a command, an image of a key on a software keyboard, etc. A "partial area within an area displayed on the screen" is, for example, a partial area or a point in a map area.

To "switch" means to change the screen display so that at least one selection item that is not displayed on the screen before the switching is displayed on the screen after the switching. Therefore, there may be selection items that are displayed both before and after the switching. To "switch according to an amount of tilt" means that the display image (display range) including selection items transitions discontinuously in response to the continuous change of the amount of tilt. Note however that the transition from the screen before the switching to the screen after the switching does not have to be made instantaneously, but the transition may take some time. For example, a transitional visual effect may be used upon switching, in which the display range transitions (scrolls) gradually.

The "selecting section" is a section for selecting an item displayed at the specified position, but is not limited to a section that always selects a selection item when the specified position coincides with the selection item on the screen. For example, the selecting section may be a section that selects an item displayed at the specified position when a predetermined condition is met (e.g., when a predetermined operation is performed by the user).

With the configuration (1) above, sets of selection items are switched from one to another according to the amount of tilt, and it is therefore possible to reduce the number of selection items as compared with a case where all the selection items are displayed at once on the screen. Thus, the operation of selecting a selection item can be made easier. Since the user can perform, through an operation of moving a single object, an operation of switching between sets of selection items and an operation of selecting a selection item, the user can easily perform two different operations with one object.

(2)

The position calculation section may calculate the specified position according to a tilt of the object about a first axis and a tilt thereof about a second axis perpendicular to the first axis, or according to a movement in a direction of the first axis and a movement in a direction of the second axis. In this case, the tilt calculation section calculates the tilt information according to a tilt of the object about a third axis perpendicular to the first axis and the second axis.

With the configuration (2) above, the operation of determining the specified position and the operation of determining the tilt information are independent of each other and do not influence each other. Therefore, the user can easily perform the two different operations.

(3)

Where a first group of selection items is displayed on the screen, the switching section may switch the selection items displayed on the screen from the first group of selection items to a second group of selection items on a condition that the amount of tilt goes above a first threshold value. Where the second group of selection items is displayed on the screen, the switching section may switch the selection items displayed on the screen from the second group of selection items to the first group of selection items on a condition that the amount of tilt goes below a second threshold value being smaller than the first threshold value.

The "first group of selection items" refers to one or more selection items displayed at once on the screen, and the "second group of selection items" refers to one or more selection items displayed at once on the screen that include selection items different from the first group of selection items.

With the configuration (3) above, switching from the first group to the second group is performed in response to the amount of tilt going above the first threshold value, and the display will not return from the second group back to the first group even if the amount of tilt thereafter goes below the first threshold value (unless it goes below the second threshold value). Therefore, even if the amount of tilt changes back and forth around the first threshold value, it is possible to prevent quick switching back and forth, thus improving the controllability of the switching operation.

(4)

The object may be an input device including detection means capable of detecting a tilt of itself or information according to a change of the tilt. In this case, the tilt calculation section calculates the tilt information by using data based on a detection result of the detection means as the operation data. The position calculation section calculates the specified position by using data based on a detection result of the detection means as the operation data.

In addition to a gyroscope, an acceleration sensor and a camera used in the embodiment below, the "detection means" may be any means as long as it is possible to obtain a detection result that changes according to the tilt of the input device or the change of the tilt. While the input device includes three detection means in the embodiment below, it is only required that the input device includes at least one detection means.

The "data based on a detection result" may be the detection result itself, or may be data obtained by processing the detection result.

With the configuration (4) above, the input device is provided with detection means, and the information processing apparatus can therefore perform the operation of calculating the tilt information and the specified position by using the operation data from the input device so as to select a selection item.

(5)

The detection means may be a gyroscope for detecting an angular velocity of the object. In this case, the tilt calculation section calculates the tilt information based on the angular velocity detected by the gyroscope. The position calculation section calculates a position of an intersection between a line segment extended from a predetermined position in a predetermined space in a direction of a vector corresponding to a tilt represented by the tilt information and a predetermined plane in the predetermined space, so as to calculate, as the specified position, a position on the screen corresponding to the position of the intersection.

The "predetermined space" is a virtual three-dimensional space, and the "predetermined plane" is a plane placed in the three-dimensional space. The "vector corresponding to a tilt represented by the tilt information" refers to a vector whose direction changes according to the tilt represented by the tilt information. That is, where the tilt information is expressed by a vector, the vector may be the vector itself represented by the tilt information, and where the tilt information is expressed by an angle or a matrix, the vector may be a vector that represents the same tilt as the tilt represented by the angle or the matrix.

With the configuration (5) above, the tilt and the specified position of the input device can be easily calculated by using a gyroscope. With the configuration (5) above, since a detection result of a gyroscope is used, it is possible to calculate the tilt and the specified position no matter which direction the input device is pointing. Therefore, the usability of the input device is not restricted, and the user can use the input device while pointing it in any direction.

(6)

The detection means may be image capturing means capable of capturing an image of a predetermined subject. In this case, the tilt calculation section calculates the tilt information based on a tilt of the subject in the captured image captured by the image capturing means. The position calculation section calculates the specified position based on a position of the subject in the captured image captured by the image capturing means.

In addition to the marker section 6 used in the embodiment below, the "predetermined subject" may be any object as long as the image thereof can be captured by the image capturing means.

With the configuration (6) above, it is possible to easily calculate the tilt and the specified position of the input device by using the image capturing means. With the configuration (6) above, a captured image is used, and it is therefore possible to accurately calculate the tilt and the specified position.

(7)

The object may be a part of a body of the user or a marker that can be used by the user. In this case, the information processing apparatus obtains, as the operation data, data based on an image-capturing result from image capturing means capturing an image of the object.

With the configuration (7) above, it is possible to easily calculate the tilt and the specified position of the object by using the image capturing means. With the configuration (7) above, a captured image is used, and it is therefore possible to accurately calculate the tilt and the specified position.

(8)

The object may be an input device including detection means capable of detecting a tilt of itself or information according to a change of the tilt. In this case, the information processing apparatus obtains, as the operation data, data based on an image-capturing result from image capturing means capturing an image of the object, and obtains, as the operation data, data based on a detection result of the detection means from the input device. The tilt calculation section calculates the tilt information based on the data based on the detection result. The position calculation section calculates the specified position based on the data based on the image-capturing result.

With the configuration (8) above, it is possible to easily calculate the tilt of the object by using the detection result obtained by the detection means. Moreover, it is possible to easily and accurately calculate the specified position specified by the object by using the image-capturing result from the image capturing means.

(9)

The display control section may display, on the screen, a part of a predetermined plane on which sets of the selection items are placed along an arc. In this case, the switching section switches between sets of the selection items displayed on the screen by rotating the predetermined plane.

To "rotate the predetermined plane" may refer to any operation as long as the predetermined plane is rotated relative to the reference (the viewpoint of the virtual camera, etc.) for determining the display range. That is, where a display image is produced by using a virtual camera, the switching section may rotate the predetermined plane or may move the virtual camera.

(10)

The selection items may be images displayed on the screen, each image being associated with a process. In this case, the selecting section performs a process associated with the image displayed at the specified position.

With the configuration (10) above, example embodiments of the present invention are also applicable to a case where an image of an icon, or the like, is displayed as a selection item.

(11)

The selection items may each be an image representing a game item, a game character, or a game command. In this case, the selecting section performs a game process according to an item, a game character or a game command represented by the image displayed at the specified position.

With the configuration (11) above, example embodiments of the present invention are also applicable to a case where a game item or a game character is displayed as a selection item, or a case where a game command is displayed as a selection item.

(12)

The selection items may each be an image representing a letter or a string of letters. In this case, the selecting section performs a process of outputting a letter represented by the image displayed at the specified position.

With the configuration (12) above, example embodiments of the present invention are also applicable to a case where an image representing a letter (or a string of letters) is displayed as a selection item, e.g., a software keyboard.

(13)

The switching section switches between letter types of the letter or the string of letters represented by the image displayed on the screen.

To "switch between letter types" means a concept including the switching capital letters and small letters of alphabet letters, the switching between hiragana (Japanese cursive alphabet) and katakana (Japanese square alphabet), the switching between fonts of letters, etc.

With the configuration (13) above, the user can switch between letter types by controlling the tilt of the object, and can select a letter by controlling the position and/or direction of the object. Thus, it is possible to provide a letter input system, with which the selection of a letter and the switching between letter types can be done easily.

(14)

The selection items may each be a partial area in an area displayed on the screen, each partial area being associated with a process. In this case, the selecting section performs a process associated with a partial area corresponding to the specified position.

The "area displayed on the screen" is a concept including an area of a map (or a game map). The "partial area" is a concept including a point or a region in a map.

With the configuration (14) above, example embodiments of the present invention are also applicable to a case where an image of a map is displayed, for example, and the user selects a point or a region in the map.

Example embodiments of the present invention may also be embodied in the form of an information processing apparatus having similar functions to those of the various sections implemented by the information processing program. In this case, each of the various sections may be implemented by a computer, such as a CPU, executing software (program), or by a dedicated circuit. Example embodiments of the present invention may be also embodied in the form of an information processing system including one or more information processing apparatuses having the various sections. In this case, the one or more information processing apparatuses may communicate with each other directly via a wired or wireless connection, or may communicate with each other via a network. Example embodiments of the present invention may also be embodied in the form of a selection method carried out by the various sections.

According to example embodiments of the present invention, sets of selection items are switched from one to another according to the amount of tilt, and it is therefore possible to reduce the number of selection items displayed at once on the screen, thereby making it easier to perform the operation of selecting a selection item.

These and other features, aspects and advantages of example embodiments of the present invention will become more apparent from the following detailed description of the example embodiments of the present invention when taken in conjunction with the accompanying drawings.

DESCRIPTION OF THE EXAMPLE EMBODIMENTS

[General Configuration of Game System]

Figure 1:
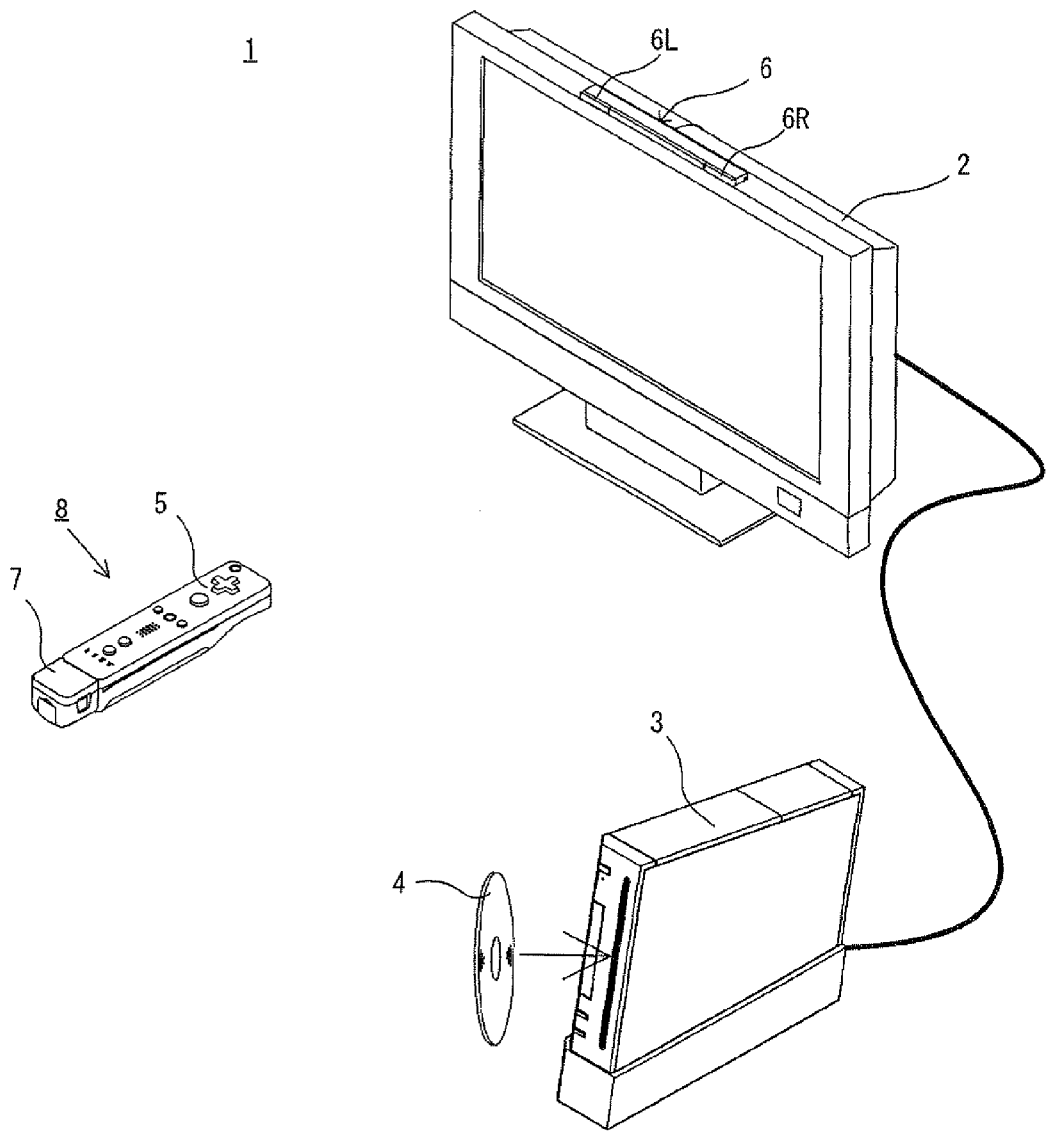
FIG. 1 is an external view of a game system.

With reference to FIG. 1, a game system 1 including a game apparatus typifying a coordinate calculation apparatus according to an embodiment of the present invention will be described. FIG. 1 is an external view of the game system 1. In the following description, a home-console type game apparatus is taken as an example for describing a game apparatus and an information processing program of the present embodiment. As shown in FIG. 1, the game system 1 includes a television receiver (hereinafter, simply referred to as a "television") 2, a game apparatus 3, an optical disc 4, an input device 8, and a marker section 6. In this system, the game apparatus 3 performs a game process based on a game operation using the input device 8.

In the game apparatus 3, the optical disc 4 typifying an information storage medium used for the game apparatus 3 in a replaceable manner is detachably inserted. An information processing program (typically a game program) executed by the game apparatus 3 is stored in the optical disc 4. The game apparatus 3 has, on the front surface thereof, an insertion opening for the optical disc 4. The game apparatus 3 reads and executes the information processing program stored in the optical disc 4 which is inserted through the insertion opening, so as to perform the game process.

The game apparatus 3 is connected to the television 2, which is an exemplary display device, through a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LEDs, and emits an infrared light forward from the television 2. The marker section 6 is connected to the game apparatus 3, and the game apparatus 3 is able to control each infrared LED of the marker section 6 so as to light up each infrared LED.

The input device 8 gives the game apparatus 3 operation data representing the content of an operation performed on the input device itself. In the present embodiment, the input device 8 includes the controller 5 and the gyroscope unit 7. As will be described in detail later, the input device 8 has a configuration in which the gyroscope unit 7 is detachably connected to the controller 5. The controller 5 and the game apparatus 3 are connected to each other by wireless communication. In the present embodiment, the wireless communication between the controller 5 and the game apparatus 3 is made using, for example, Bluetooth (Registered Trademark) technology. In another embodiment, the connection between the controller 5 and the game apparatus 3 may be a wired connection.

[Internal Configuration of Game Apparatus 3]

Figure 2:
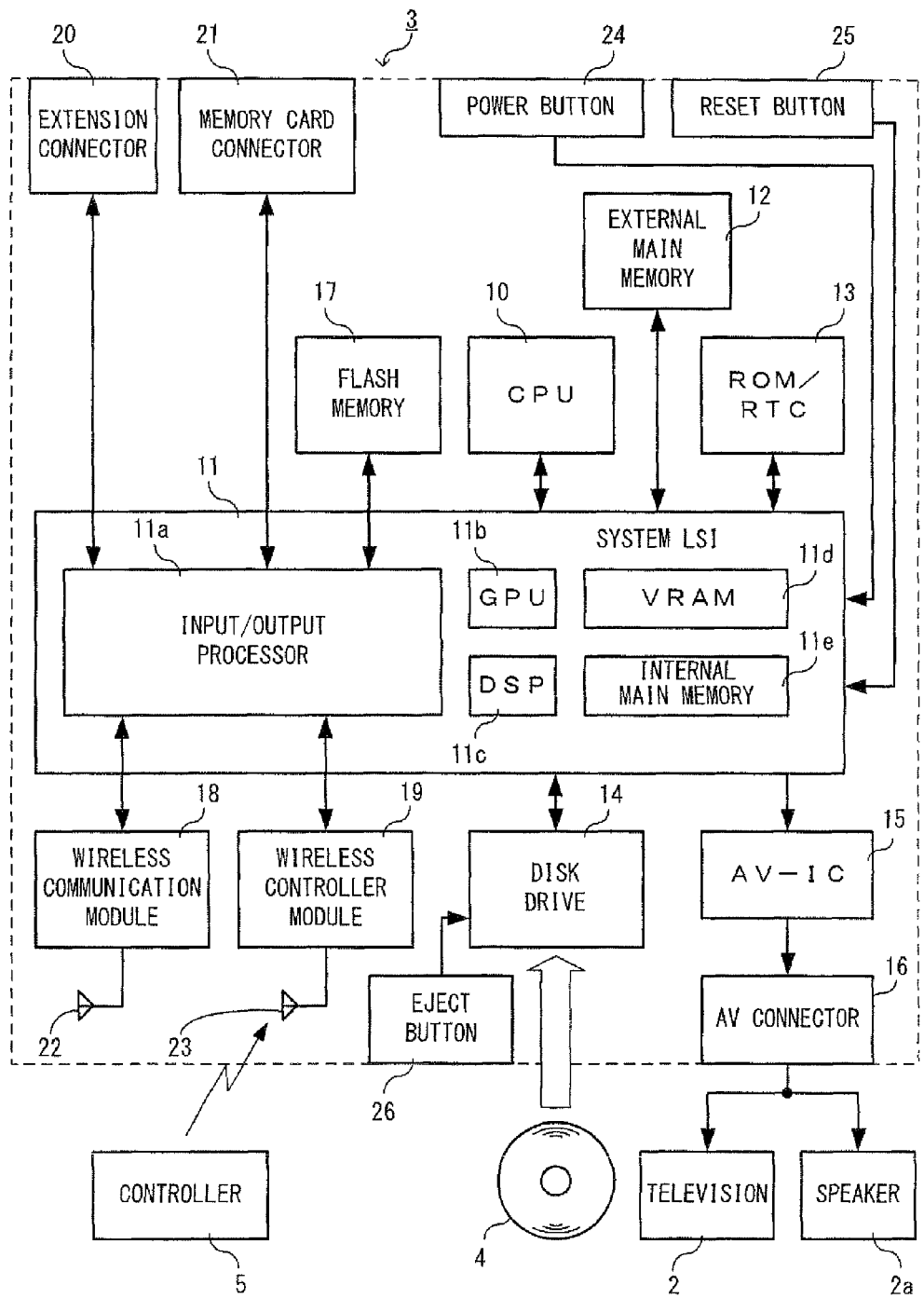
FIG. 2 is a functional block diagram of a game apparatus.

Next, an internal configuration of the game apparatus 3 will be described with reference to FIG. 2. FIG. 2 is a block diagram illustrating a configuration of the game apparatus 3. The game apparatus 3 includes a CPU 10, a system LSI 11, an external main memory 12, a ROM/RTC 13, a disc drive 14, an AV-IC 15, and the like.

The CPU 10, functioning as a game processor, performs game processes by executing the information processing program stored in the optical disc 4. The CPU 10 is connected to the system LSI 11. To the system LSI 11, the external main memory 12, the ROM/RTC 13, the disc drive 14, and the AV-IC 15 as well as the CPU 10 are connected. The system LSI 11 performs processes for controlling data transmission between the respective components connected thereto, generating an image to be displayed, acquiring data from an external device, and the like. The internal configuration of the system LSI will be described below. The external main memory 12 of a volatile type stores a program such as an information processing program read from the optical disc 4 and an information processing program read from a flash memory 17, and various data, and an external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disc drive 14 reads program data, texture data, and the like from the optical disc 4, and writes the read data into an internal main memory 11e to be described below or the external main memory 12.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data using data stored in the VRAM 11d.

The DSP 11c, functioning as an audio processor, generates audio data using sound data and sound waveform (tone quality) data stored in an internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the components connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects the presence or absence of any data which needs to be transmitted to the network, and when detected, transmits the data to the network through the wireless communication module 18 and the antenna 22. Further, the input/output processor 11a receives data transmitted from another game apparatus, and/or downloads data from a download server, through the network, the antenna 22, and the wireless communication module 18, and the received data and/or the downloaded data are stored to the flash memory 17. The CPU 10 executes an information processing program so as to read data stored in the flash memory 17 and use the data on the information processing program. The flash memory 17 may store saved data (game result data or intermediate-stage data) of a game played using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data to a buffer area of the internal main memory 11e or the external main memory 12.

Further, the input/output processor 11a is connected to the extension connector 20 and the memory card connector 21. The extension connector 20 is a connector for an interface, such as USB or SCSI, and allows communication with the network by connecting thereto a medium such as an external storage medium, connecting thereto another peripheral device such as a controller, and/or connecting thereto a wired communication connector, without using the wireless communication module 18. The memory card connector 21 is a connector for connecting thereto an external storage medium such as a memory card. For example, the input/output processor 11a accesses an external storage medium through the extension connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disc drive 14. When the eject button 26 is pressed, the optical disc 4 is ejected from the disc drive 14.

[Configuration of Input Device 8]

Figure 3:
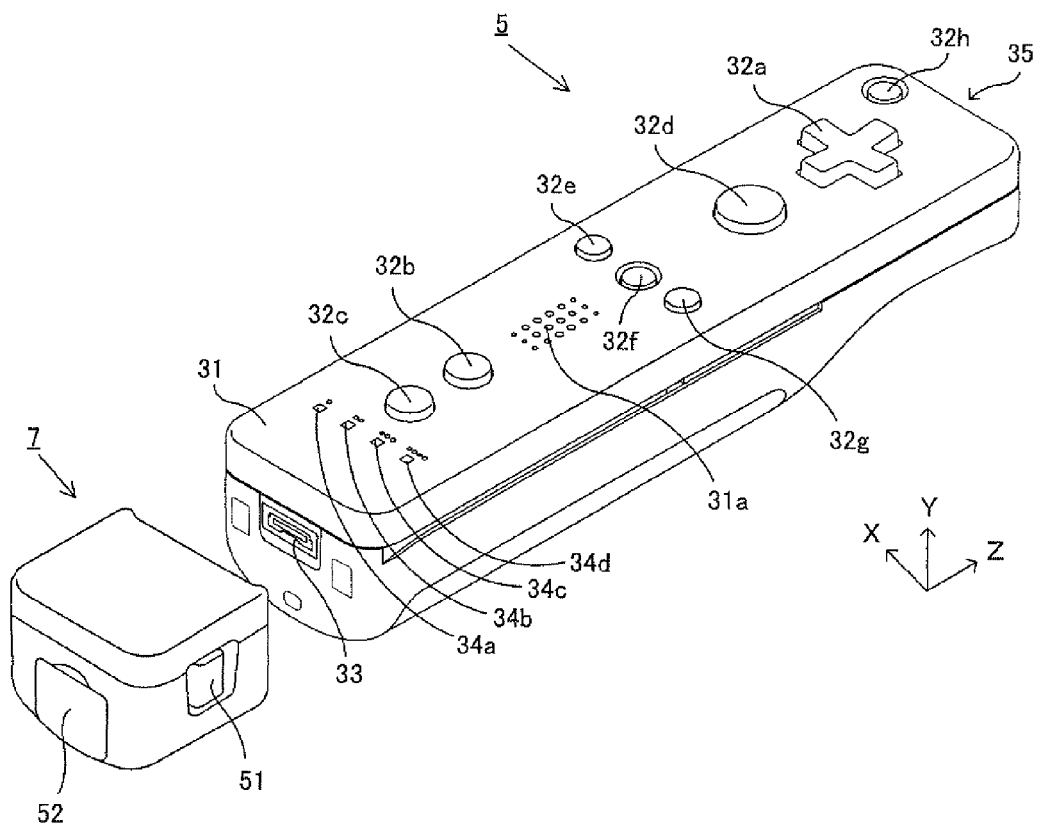
FIG. 3 is a perspective view illustrating an external configuration of an input device.
Figure 4:
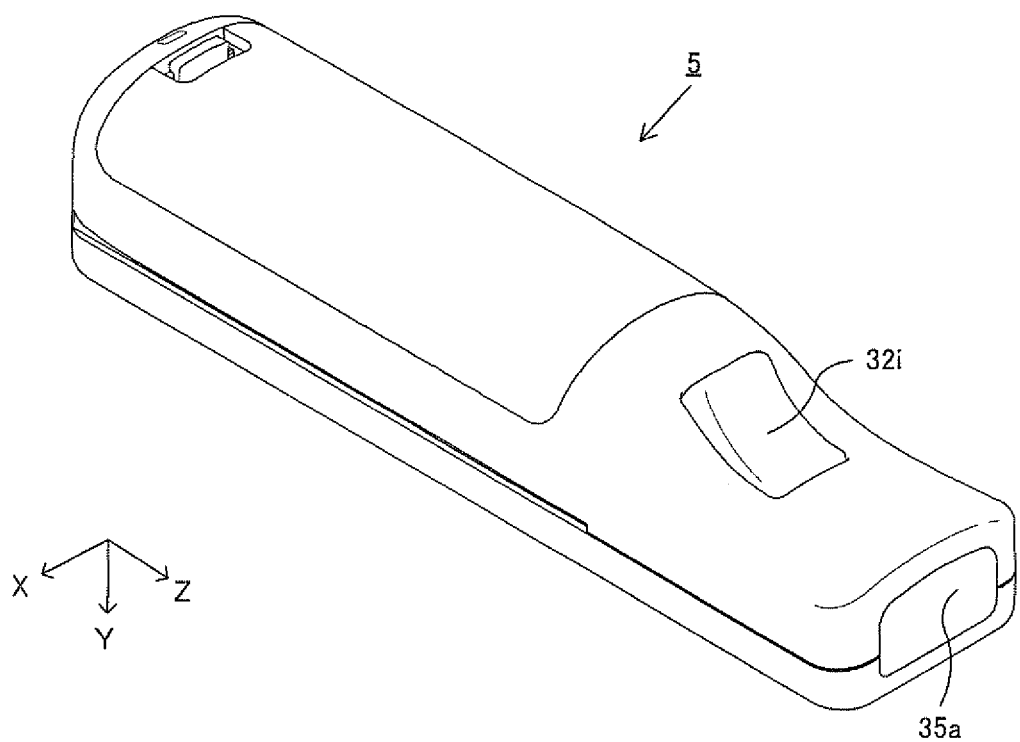
FIG. 4 is a perspective view illustrating an external configuration of a controller.

Next, with reference to FIGS. 3 to 6, the input device 8 will be described. FIG. 3 is a perspective view illustrating an external configuration of the input device 8. FIG. 4 is a perspective view illustrating an external configuration of the controller 5. The perspective view of FIG. 3 shows the controller 5 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. A player can perform game operations by pressing buttons provided on the controller 5, and moving the controller 5 to change the position and the orientation (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In example embodiments of the present invention, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the information processing program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the player.

On the rear surface of the housing 31, a connector 33 is provided. The connector 33 is used for connecting the controller 5 to another device (e.g., a gyroscope unit 7 or another controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example. Specifically, when a game operation is performed using the controller 5, one of the plurality of LEDs 34a, 34b, 34c, and 34d corresponding to the controller type is lit up.

The controller 5 has an image capturing/processing section 35 (FIG. 6), and a light incident surface 35a through which a light is incident on the image capturing/processing section 35 is provided on the front surface of the housing 31, as shown in FIG. 4. The light incident surface 35a is made of a material transmitting therethrough at least infrared light outputted from the markers 6R and 6L.

On the top surface of the housing 31, sound holes 31a for externally outputting a sound from a speaker 49 (shown in FIG. 5) incorporated in the controller 5 is provided between the first button 32b and the home button 32f.

Figure 5:
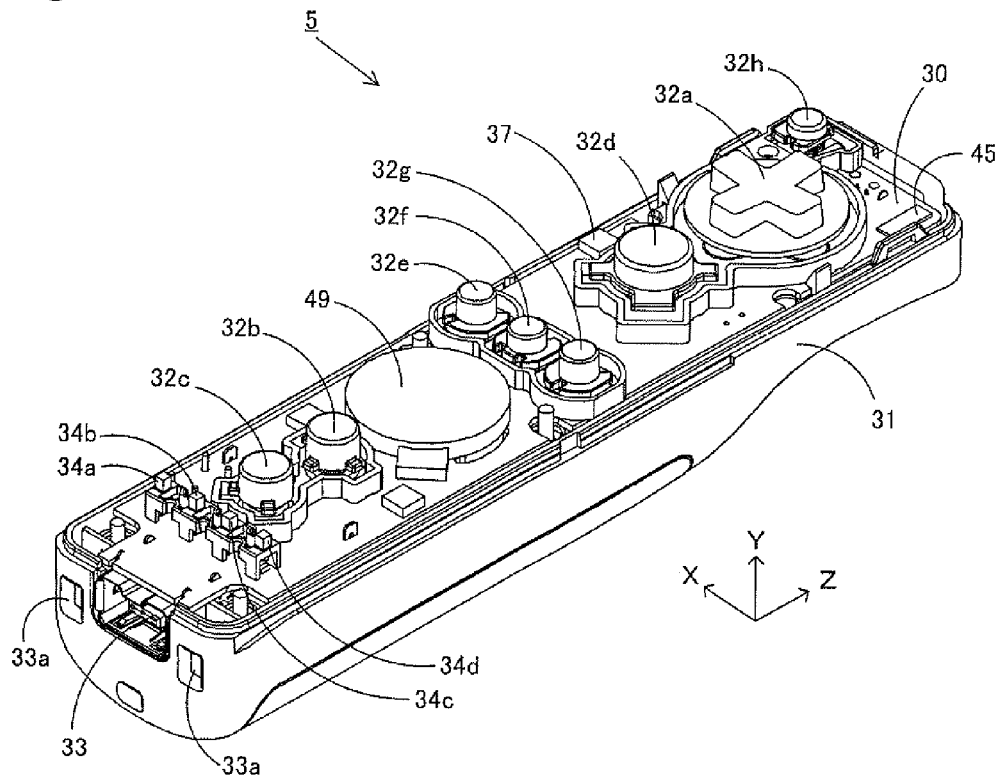
FIG. 5 is a diagram illustrating an internal structure of the controller.
Figure 6:
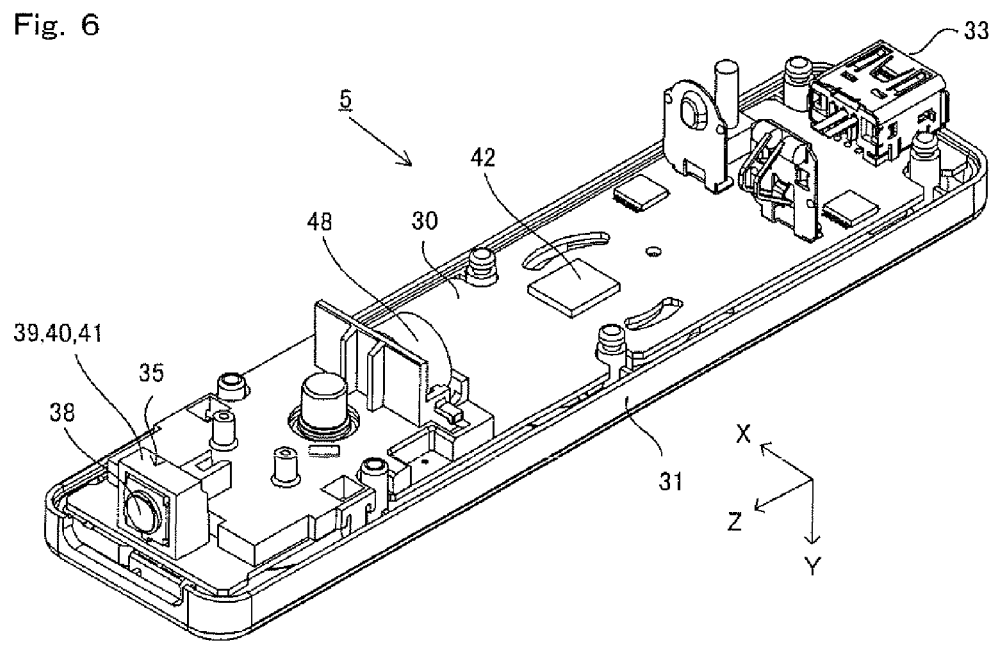
FIG. 6 is another diagram illustrating an internal structure of the controller.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, an acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided anterior to the center of the controller 5 with respect to the longitudinal direction (Z-axis direction). Further, a wireless module 44 (FIG. 6) and the antenna 45 allow the controller 5 to act as a wireless controller.

On the other hand, as shown in FIG. 6, at a front edge of a bottom main surface of the substrate 30, the image capturing/processing section 35 is provided. The image capturing/processing section 35 includes an infrared filter 38, a lens 39, an image capturing element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controllers. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Figure 7:
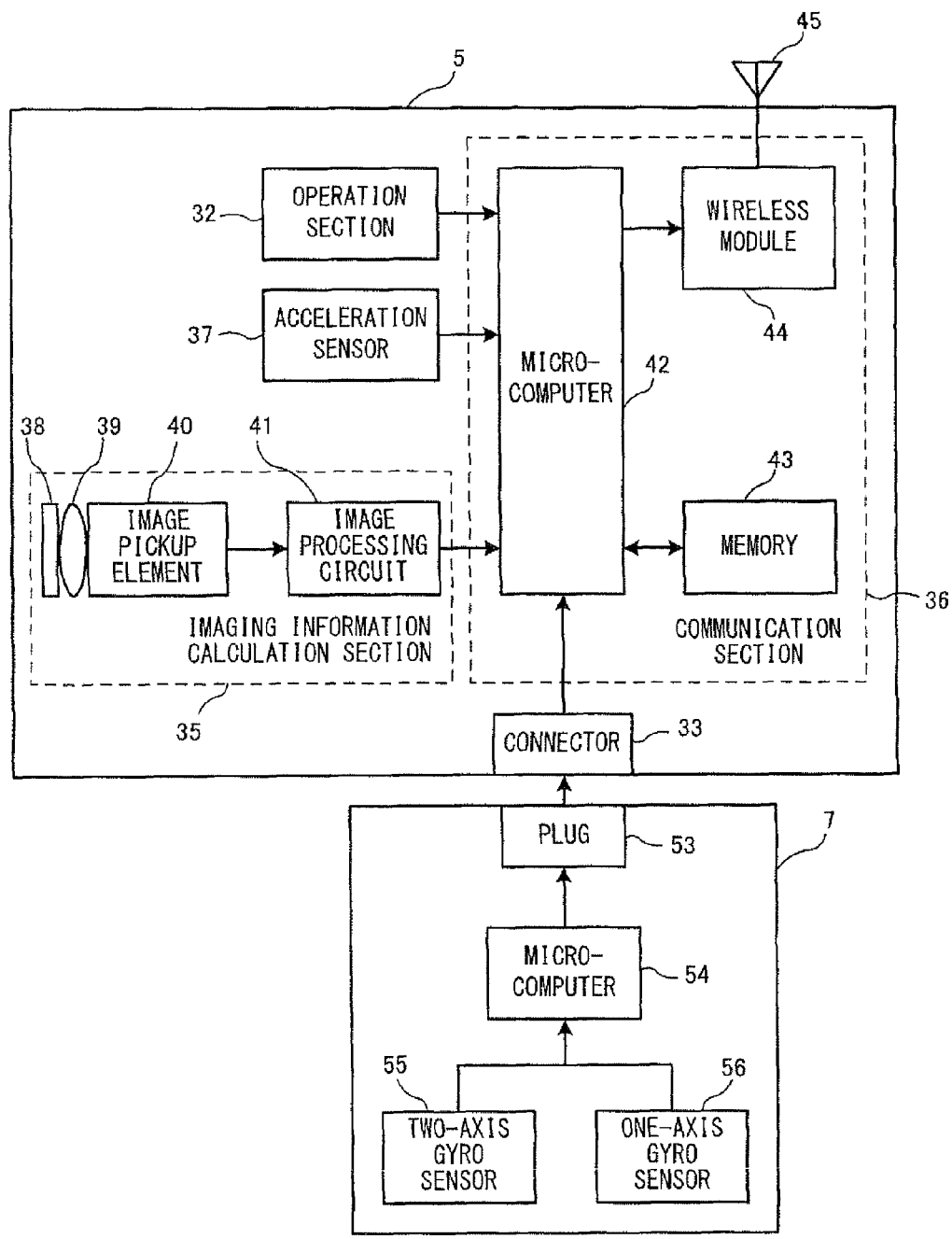
FIG. 7 is a block diagram illustrating a configuration of the input device.

The gyroscope unit 7 includes gyroscopes for detecting angular velocities about three axes (gyroscopes 55 and 56 shown in FIG. 7). The gyroscope unit 7 is detachably attached to the connector 33 of the controller 5. A plug (a plug 53 shown in FIG. 7) that can be connected to the connector 33 is provided at the front end of the gyroscope unit 7 (the end portion on the Z-axis positive direction side shown in FIG. 3). Moreover, hooks (not shown) are provided on both sides of the plug 53. In a state where the gyroscope unit 7 is attached to the controller 5, the plug 53 is connected to the connector 33 with the hooks being engaged with fastening holes 33a in the controller 5. Thus, the controller 5 and the gyroscope unit 7 are firmly secured to each other. The gyroscope unit 7 has a button 51 on a side surface thereof (the surface in the X-axis direction shown in FIG. 3). The button 51 is configured so that the engagement of the hooks with the fastening holes 33a can be released by pressing the button 51. Thus, the gyroscope unit 7 can be detached from the controller 5 by pulling the plug 53 off of the connector 33 while holding down the button 51.

A connector having the same shape as the connector 33 is provided at the rear end of the gyroscope unit 7. Therefore, another unit that can be attached to the controller 5 (the connector 33 thereof) can also be attached to the connector of the gyroscope unit 7. Note that in FIG. 3, a cover 52 is detachably attached to this connector.

Note that the shape of the controller 5 and the gyroscope unit 7, the shape of each operation button, the number and the positions of acceleration sensors and vibrators, and so on, shown in FIGS. 3 to 6 are merely illustrative, and the present invention can be realized with other shapes, numbers, and positions. Further, although in the present embodiment the imaging direction of the image pickup means is the Z-axis positive direction, the imaging direction may be any direction. That is, the imagining information calculation section 35 (the light incident surface 35a through which a light is incident on the image capturing/processing section 35) of the controller 5 may not necessarily be provided on the front surface of the housing 31, but may be provided on any other surface on which a light can be received from the outside of the housing 31.

FIG. 7 is a block diagram illustrating a configuration of the input device 8 (the controller 5 and the gyroscope unit 7). The controller 5 includes an operation section 32 (the operation buttons 32a to 32i), the connector 33, the image capturing/processing section 35, a communication section 36, and the acceleration sensor 37. The controller 5 transmits, as operation data, data representing the content of an operation performed on the controller itself, to the game apparatus 3.

The operation section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The image capturing/processing section 35 is a system for analyzing image data taken by the image pickup means and calculating, for example, the centroid and the size of an area having a high brightness in the image data. The image capturing/processing section 35 has a maximum sampling period of, for example, about 200 frames/sec., and therefore can trace and analyze even a relatively fast motion of the controller 5.

The image capturing/processing section 35 includes the infrared filter 38, the lens 39, an image capturing element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image capturing element 40. The image capturing element 40 is a solid-state imaging device such as, for example, a CMOS sensor or a CCD sensor, which receives the infrared light collected by the lens 39, and outputs an image signal. The markers 6R and 6L of the marker section 6 provided near the display screen of the television 2 each include an infrared LED for outputting an infrared light forward from the television 2. Therefore, the infrared filter 38 enables the image capturing element 40 to receive only the infrared light transmitted through the infrared filter 38 and generate image data, so that an image of each of the markers 6R and 6L can be taken with enhanced accuracy. Hereinafter, the image taken by the image capturing element 40 is referred to as a captured image. The image data generated by the image capturing element 40 is processed by the image processing circuit 41. The image processing circuit 41 calculates, in the captured image, the positions of subjects to be imaged (the marker 6R and the marker 6L). The image processing circuit 41 outputs coordinates of the calculated positions, to the microcomputer 42 of the communication section 36. The data representing the coordinates is transmitted as operation data to the game apparatus 3 by the microcomputer 42. Hereinafter, the coordinates are referred to as "marker coordinates". The marker coordinates change depending on the orientation (tilt angle) and/or the position of the controller 5 itself, and therefore the game apparatus 3 is allowed to calculate the orientation and the position of the controller 5 using the marker coordinates.

In another embodiment, the controller 5 may not necessarily include the image processing circuit 41, and the controller 5 may transmit the captured image as it is to the game apparatus 3. At this time, the game apparatus 3 may have a circuit or a program, having the same function as the image processing circuit 41, for calculating the marker coordinates.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects an acceleration in the straight line direction along each axis, and an output from the acceleration sensor 37 represents a value of the linear acceleration for each of the three axes. In other words, the detected acceleration is represented as a three-dimensional vector (ax,ay,az) in an XYZ-coordinate system (controller coordinate system) defined relative to the input device 8 (controller 5). Hereinafter, a vector representing components of the acceleration values detected for the three axes, respectively, by the acceleration sensor 37 is referred to as an acceleration vector.

Data (acceleration data) representing the acceleration detected by the acceleration sensor 37 is outputted to the communication section 36. The acceleration detected by the acceleration sensor 37 changes depending on the orientation (tilt angle) and the movement of the controller 5 itself, and therefore the game apparatus 3 is allowed to calculate the orientation and the movement of the controller 5 using the obtained acceleration data. In the present embodiment, the game apparatus 3 determines the orientation, the tilt angle, etc., of the controller 5 based on the obtained acceleration data.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1 G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the tilt angle. Thus, the acceleration sensor 37 is used in combination with the processor, making it possible to determine the tilt angle or the orientation of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding tilt angle (or another preferable parameter).

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. The data transmitted from the gyroscope unit 7 is inputted to the microcomputer 42 via the connector 33. Hereinafter, the configuration of the gyroscope unit 7 will be described.

The gyroscope unit 7 includes the plug 53, a microcomputer 54, the 2-axis gyroscope 55, and the 1-axis gyroscope 56. As described above, the gyroscope unit 7 detects the angular velocities about three axes (the X, Y and Z axes in the present embodiment), and transmits data (angular velocity data) representing the detected angular velocities to the controller 5.

The 2-axis gyroscope 55 detects the angular velocity about the X axis and the angular velocity about the Z axis (per unit time). The 1-axis gyroscope 56 detects the angular velocity about the Y axis (per unit time). Note that the rotation directions about the X, Y and Z axes are herein referred to as the pitch direction, the yaw direction and the roll direction, respectively, with respect to the image-capturing direction of the controller 5 (the Z-axis positive direction). That is, the 2-axis gyroscope 55 detects the angular velocity about the pitch direction (the rotation direction about the X axis) and the angular velocity about the roll direction (the rotation direction about the Z axis), and the 1-axis gyroscope 56 detects the angular velocity about the yaw direction (the rotation direction about the Y axis).

Note that while the 2-axis gyroscope 55 and the 1-axis gyroscope 56 are used for detecting angular velocities about three axes in the present embodiment, the number and combination of gyroscopes used may be any number and combination in other embodiments as long as angular velocities about three axes can be detected.

Data representing the angular velocities detected by the gyroscopes 55 and 56 are outputted to the microcomputer 54. Therefore, the microcomputer 54 receives data representing the angular velocities about three axes of the X, Y and Z axes. The microcomputer 54 transmits the data representing the angular velocities about three axes as angular velocity data to the controller 5 via the plug 53. Note that the transmission from the microcomputer 54 to the controller 5 is sequentially performed at a predetermined time interval. Since the game process is generally performed at a cycle of 1/60 sec (corresponding to one frame time), the transmission is preferably performed at a cycle of a shorter time period.

Back to the description of the controller 5, data outputted from the operation section 32, the image capturing/processing section 35, and the acceleration sensor 37 to the microcomputer 42, and data transmitted from the gyroscope unit 7 to the microcomputer 42, are temporarily stored to the memory 43. The data are transmitted as the operation data to the game apparatus 3. At the time of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the information processing program, the CPU 10 of the game apparatus 3 performs the game process. The wireless transmission from the communication section 36 to the wireless controller module 19 is sequentially performed at a predetermined time interval. Since the game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

As described above, the game apparatus 3 can obtain marker coordinate data, acceleration data and angular velocity data as operation data according to the tilt of the input device 8 controlled by the user. Note that in other embodiments, the operation data obtained by the game apparatus 3 may be any data such that the tilt of the input device and the specified position can be calculated based on the operation data, and the game apparatus 3 may obtain at least one of the marker coordinate data, the acceleration data and the angular velocity data. When the input device 8 is used, the player can perform not only the conventional, typical game operation of pressing operation buttons, but also an operation of tilting the input device 8 at an intended tilt angle. Moreover, with the input device 8, the player can also perform an operation of specifying an intended position on the screen with the input device 8, and an operation of moving around the input device 8 itself.

[Outline of Process by Game Apparatus 3]

Next, referring to FIGS. 8 and 9, the outline of the process performed by the game apparatus 3 will be described. The game apparatus 3 performs a process in which the user uses the input device 8 to perform an operation of selecting an item from among a plurality of selection items displayed on the screen. In the present embodiment, an example where the user inputs a letter will be described. That is, the game apparatus 3 displays a plurality of images representing letters on the screen and the user selects an image from among the plurality of images, thereby accepting the input of the letter represented by the selected image.

Figure 8:
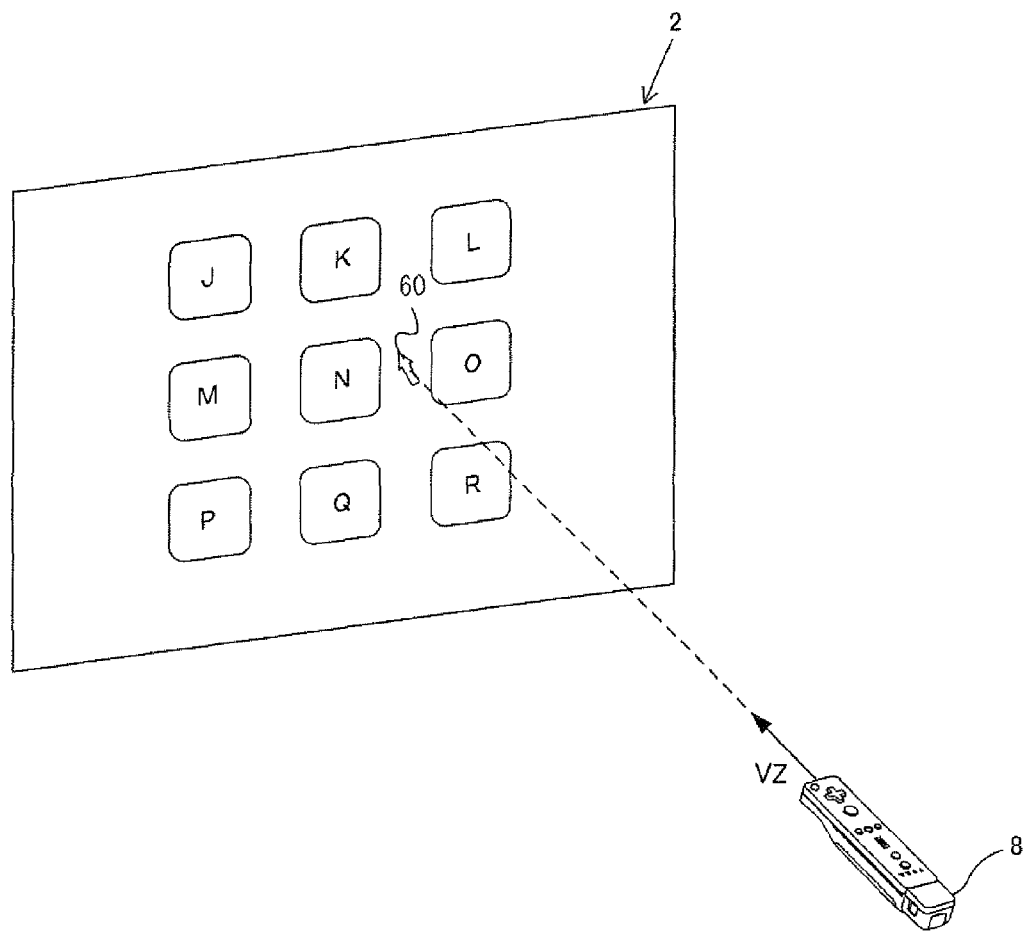
FIG. 8 is a diagram showing an example of images displayed on the screen of a television by a process of the game apparatus.
Figure 9:
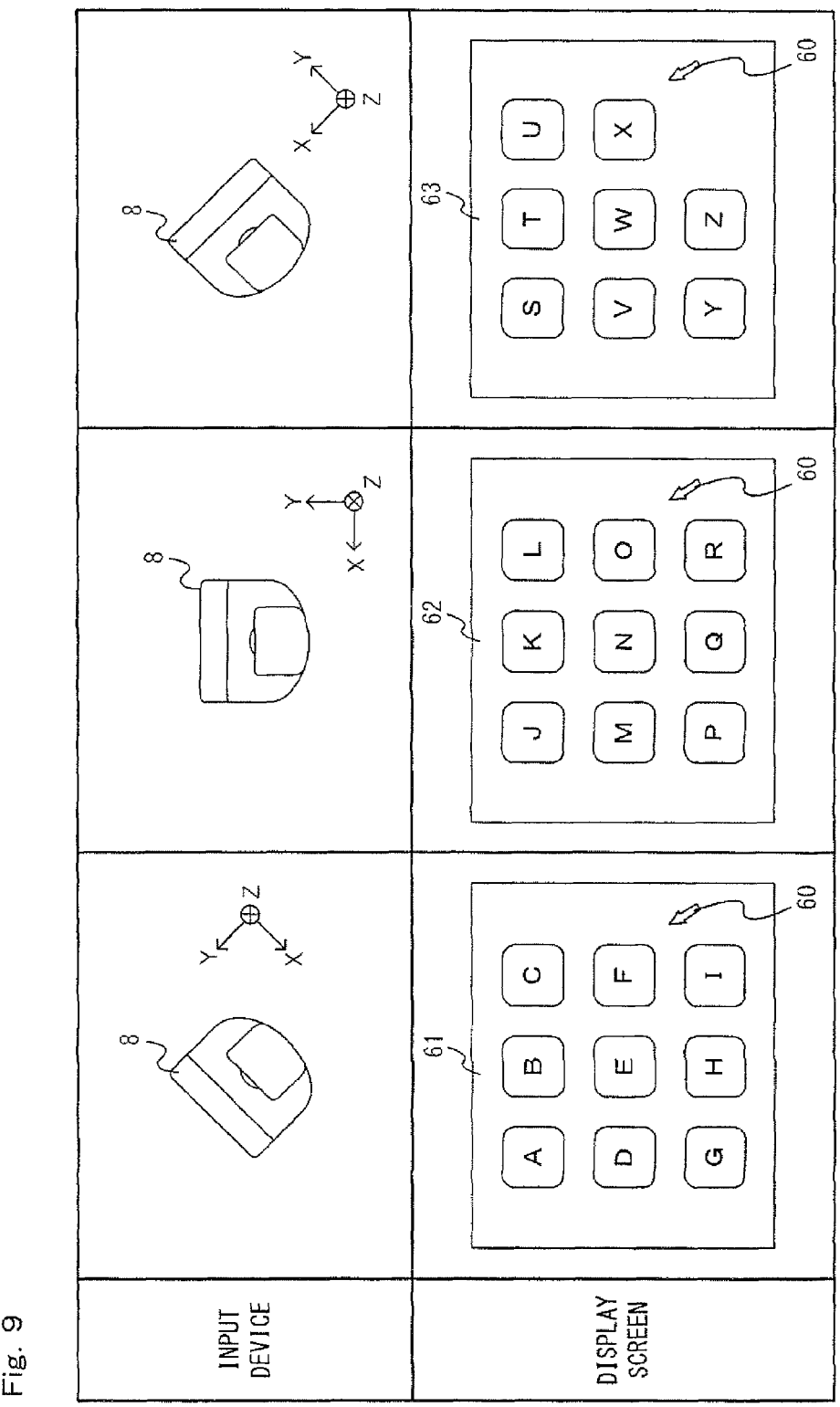
FIG. 9 is a table showing the relationship between the tilt of the input device and selection items displayed.

FIG. 8 is a diagram showing an example of images displayed on the screen of the television 2 by the process performed by the game apparatus 3. In FIG. 8, letter images representing "J" to "R" and a cursor 60 are displayed on the screen. The letter images displayed on the screen are selection items from which the user makes a selection. Note that while an example where the selection items are letter images is described herein, the selection items may be any items, i.e., icons or points on a map.

The cursor 60 is displayed at a position on the screen being pointed by the input device 8 (hereinafter referred to as the "specified position"), as shown in FIG. 8. The "position being pointed by the input device 8 (the specified position)" is ideally the position of the intersection between the screen and a straight line obtained by extending the Z axis of the input device 8 (the controller 5) in the positive direction. In practice, however, the game apparatus 3 does not need to strictly calculate the position of the intersection as the specified position, but may calculate a position in the vicinity of the position of the intersection. The details of the method for calculating the specified position in the present embodiment will be described later. In other embodiments, the specified position does not have to be a position in the vicinity of the intersection, but may be what is calculated so that it changes according to at least one of the position and the tilt (orientation) of the input device 8. For example, in other embodiments, the game apparatus 3 may detect the moving direction of the input device 8 by means of an acceleration sensor so as to move the specified position according to the moving direction. As described above, the game apparatus 3 calculates the specified position based on operation data so that it changes according to at least one of the position and the direction of the input device 8.

In the present embodiment, the user moves the cursor 60 by moving the specified position by controlling the direction (and/or the position) of the input device 8. Then, the user presses a predetermined button (e.g., the A button 32d) of the controller 5 while the cursor 60 is pointing at a letter image representing a letter that the user intends to input, thereby inputting the letter. In response to the predetermined button being pressed, the game apparatus 3 accepts the input of the letter represented by the letter image being pointed by the cursor 60. Thus, the game apparatus 3 displays a plurality of letter images on the screen, and the user selects an image from among the plurality of letter images using the input device 8.

In the present embodiment, the game apparatus 3 calculates the tilt of the input device 8 based on the operation data. Then, the set of selection items (letter images) displayed on the screen is switched to another according to the amount of tilt of the input device 8. FIG. 9 is a table showing the relationship between the tilt of the input device 8 and the corresponding set of selection items displayed. As shown in FIG. 9, the input device 8 switches between sets of selection items according to the amount of tilt about the Z axis with reference to the reference orientation, which is the orientation in which the button surface (the upper surface of the housing 31 where the buttons 32a to 32h are provided) faces vertically upward. Specifically, when the input device 8 is in the reference orientation, a set of letter images 62 representing "J" to "R" are displayed as selection items (the center column in FIG. 9). When the input device 8 is tilted to the left from the reference orientation, a set of letter images 61 representing "A" to "I" are displayed as selection items (the left column in FIG. 9). When the input device 8 is tilted to the right from the reference orientation, a set of letter images 63 representing "S" to "Z" are displayed as selection items (the right column in FIG. 9). Note that "to the right" or "to the left" refers to a rotation direction as viewed in the Z-axis negative-to-positive direction.

As described above, in the present embodiment, the user can select and input a letter from among "A" to "Z" by combining together the operation of pointing at a position on the screen with the Z axis of the input device 8 and the operation of tilting the input device 8 about the Z axis. In the present embodiment, a selection can be made from among 26 different letter images, but the number of letter images displayed simultaneously on the screen is nine or eight. Therefore, as compared with a conventional method of displaying all the 26 letter images at once, it is possible to reduce the number of letter images to be displayed simultaneously on the screen. When too many letter images are displayed at once, it is difficult to perform the letter image selection operation. The present embodiment reduces the number of letter images displayed at once on the screen so that the user can easily perform the selection operation. In the present embodiment, the user can perform both the operation of selecting a letter image (the operation of moving the specified position) and the operation of switching between sets of letter images (the operation of changing the tilt of the input device 8), using the input device 8. Therefore, the two different operations can be performed simultaneously, and it is possible to easily perform an input operation involving two different operations. It is possible to perform an input operation involving two different operations with one hand.

[Details of Process by Game Apparatus 3]

Figure 10:
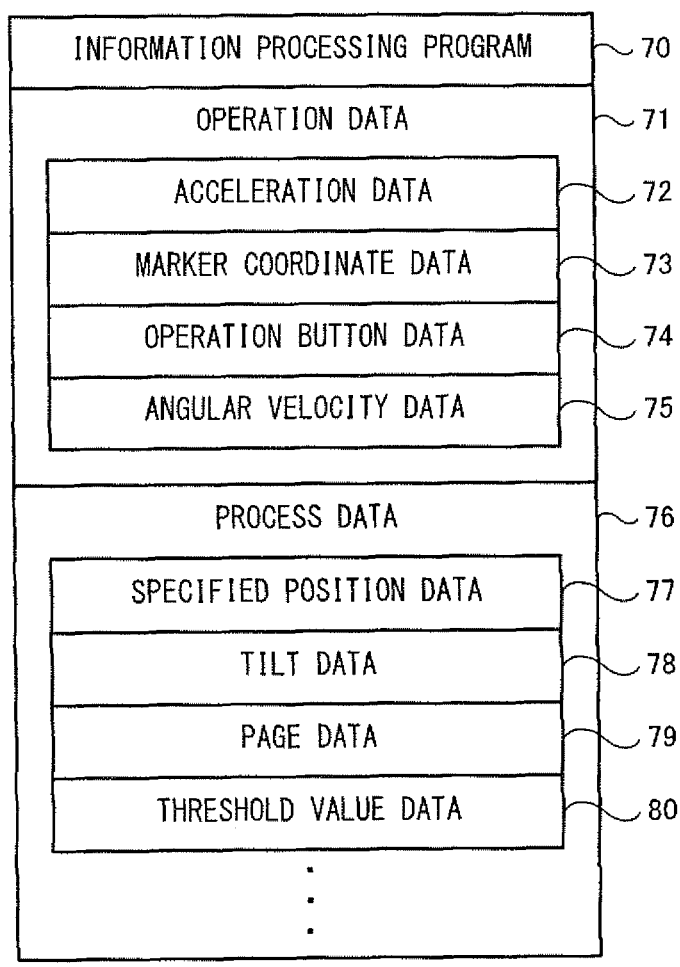
FIG. 10 is a diagram illustrating important data stored in a main memory of the game apparatus.

Next, the details of the process performed by the game apparatus 3 will be described. First, important data used in the process performed by the game apparatus 3 will be described with reference to FIG. 10. FIG. 10 shows important data stored in the main memory of the game apparatus 3 (the external main memory 12 or the internal main memory 11e). As shown in FIG. 10, the main memory of the game apparatus 3 stores an information processing program 70, operation data 71, and process data 76. Note that in addition to those shown in FIG. 10, the main memory also stores other data necessary for the process, such as image data of various objects displayed on the screen, and data representing various parameters of the objects.

At an appropriate point in time after the power of the game apparatus 3 is turned ON, part or whole of the information processing program 70 is loaded from the optical disc 4 and stored in the main memory. The information processing program 70 includes a program for displaying selection items (specifically, letter images) and performing a process according to the item selected by the user from among the displayed selection items (specifically, a process of outputting a letter represented by the letter image).

The operation data 71 is operation data transmitted from the controller 5 to the game apparatus 3. As described above, since the operation data is transmitted at a rate of once per $\frac{1}{200}$ sec from the controller 5 to the game apparatus 3, the operation data 71 stored in the main memory is updated at this rate. In the present embodiment, the main memory needs to store only the newest (last obtained) operation data. As shown in FIG. 10, the operation data 71 includes acceleration data 72, marker coordinate data 73, operation button data 74, and angular velocity data 75.

The acceleration data 72 is data representing the acceleration (acceleration vector) detected by the acceleration sensor 37. Herein, the acceleration data 72 represents a three-dimensional acceleration vector, each component of which is the acceleration in the direction of one of the three, X, Y and Z axes, shown in FIG. 3. In the present embodiment, the magnitude of the acceleration vector detected by the acceleration sensor 37 while the controller 5 is being stationary is "1". That is, the magnitude of the gravitational acceleration detected by the acceleration sensor 37 is "1".

The marker coordinate data 73 is data representing the coordinates calculated by the image processing circuit 41 of the image capturing/processing section 35, i.e., the marker coordinates described above. The marker coordinates are expressed in a two-dimensional coordinate system (the x'y' coordinate system shown in FIG. 17) for representing positions on the plane corresponding to the captured image. Note that if the two markers 6R and 6L are captured by the image capturing element 40, two sets of marker coordinates are calculated. If one of the markers 6R and 6L is not located within the range that can be captured by the image capturing element 40, only one marker is captured by the image capturing element 40, and only one set of marker coordinates is calculated. If neither of the markers 6R and 6L is located within the range that can be captured by the image capturing element 40, no marker is captured by the image capturing element 40, and no marker coordinates are calculated. Thus, the marker coordinate data 73 may represent two sets of marker coordinates, represent one set of marker coordinates, or indicate that there are no marker coordinates.

The operation button data 74 is data representing the input status of each of the operation buttons 32a to 32i. That is, the operation button data 74 represents whether or not each of the operation buttons 32a to 32i is pressed.

The angular velocity data 75 is data representing the angular velocities detected by the gyroscopes 55 and 56 of the gyroscope unit 7. Herein, the angular velocity data 75 represents the angular velocity about each of the X, Y and Z three axes shown in FIG. 3.

The process data 76 is data used in a letter input process (FIG. 11) to be described later. The process data 76 includes specified position data 77, tilt data 78, page data 79, and threshold value data 80.

The specified position data 77 is data representing the specified position on the screen. In the present embodiment, a specified position is expressed in a two-dimensional coordinate system for representing positions on the screen. In the present embodiment, the specified position is calculated based on the tilt of the input device 8, which is calculated from the operation data 71. More specifically, the specified position is calculated based on the tilt about the X axis and the tilt about the Y axis, among the tilts of the input device 8. The specified position is used in the process of selecting an item from among selection items (a plurality of letter images).

The tilt data 78 is data representing the tilt of the input device 8. The tilt represented by the tilt data 78 is used in the process of switching between sets of selection items. The tilt data 78 represents one of the tilts (orientations) of the input device 8 about the Z axis. That is, the tilt data 78 used in the process of switching between sets of selection items represents a tilt about an axis (the Z axis) that is not used in the calculation of the specified position. In the present embodiment, the tilt of the input device 8 is expressed as an angle $\theta$ ($-180° < \theta \leq 180°$) of which a positive value represents a tilt to the right as viewed in the Z-axis negative-to-positive direction, with 0° being the reference orientation (the orientation in which the button surface faces vertically upward).

The page data 79 represents a group of selection items actually displayed, among all selection items that can be displayed on the screen. In the present embodiment, one of the set of letter images 61 representing "A" to "I", the set of letter images 62 representing "J" to "R", and the set of letter images 63 representing "S" to "Z" is displayed on the screen. Herein, the set of letter images 61 is referred to as the first page, the set of letter images 62 as the second page, and the set of letter images 63 as the third page. The page data indicates one of the first to third pages. Note that while the number of pages that can be switched from one to another is three in the present embodiment, the number of pages is not limited to this. It should be noted however that with too many pages, it is difficult for the user to perform the operation so that an intended page is displayed.

The threshold value data 80 is data representing the threshold value (the upper limit value and/or the lower limit value) based on which the set of selection items displayed on the screen is switched to another. The set of selection items is switched to another when the tilt represented by the tilt data 78 goes above or below a threshold value. In the present embodiment, the threshold value is set for each page. Specifically, the threshold value data 80 represents the following threshold values.

First page: Upper limit value=$\theta 1°$
Second page: Lower limit value=$\theta 2°$, Upper limit value=$\theta 3°$
Third page: Lower limit value=$\theta 4°$ The threshold value $\theta 1°$ of the first page means that where the first page is displayed, the page is switched to the second page when the tilt angle $\theta$ of the input device 8 goes above the upper limit value $\theta 1°$. The threshold values $\theta 2°$ and $\theta 3°$ of the second page mean that where the second page is displayed, the page is switched to the first page when the tilt angle $\theta$ of the input device 8 goes below the lower limit value $\theta 2°$ and to the third page when it goes above the upper limit value $\theta 3°$. The threshold value $\theta 4°$ of the third page means that where the third page is displayed, the page is switched to the second page when the tilt angle $\theta$ of the input device 8 goes above the lower limit value $\theta 4°$. Note that the threshold values $\theta 1$ and $\theta 2$ are negative values, and the threshold values $\theta 3$ and $\theta 4$ are positive values. The threshold values are set so that $\theta 1 \geq \theta 2$ and $\theta 3 \geq \theta 4$, the details of which will be described later.

Figure 11:
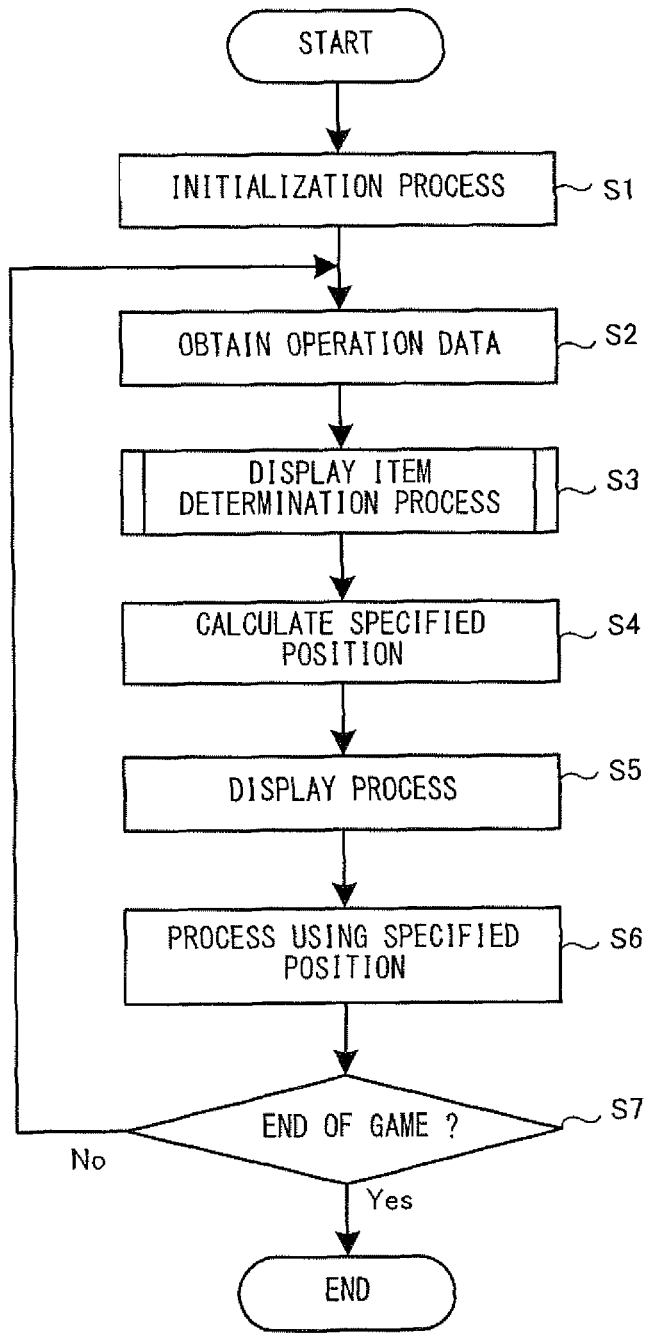
FIG. 11 is a main flow chart showing a flow of a letter input process performed by the game apparatus.

Next, the detailed flow of the process performed by the game apparatus 3 will be described with reference to FIGS. 11 and 12. FIG. 11 is a main flow chart showing a flow of the letter input process performed by the game apparatus 3. When the power of the game apparatus 3 is turned on the CPU 10 of the game apparatus 3 executes a boot program stored in a boot ROM (not shown), so as to initialize each unit, including the main memory. The information processing program stored in the optical disc 4 is loaded to the main memory, and the CPU 10 starts executing the information processing program. The flow chart of FIG. 11 illustrates a process performed when the processes described above are completed.

First, in step S1, the CPU 10 performs an initialization process. In this initialization process, values of various parameters used in the letter input process are initialized. For example, in the present embodiment, data representing the second page is stored as the page data 79 in the main memory. In the initialization process, a virtual space is constructed in which the letter images, being selection items, are arranged. After step S1 described above, the process loop through steps S2 to S7 is repeatedly performed while the game is performed. Note that the process loop is performed at a rate of once per one frame period (e.g., 1/60 sec).

In step S2, the CPU 10 acquires operation data. Specifically, operation data transmitted from the controller 5 is received via the wireless controller module 19. Then, acceleration data, marker coordinate data, operation button data, and angular velocity data included in the received operation data are stored to the main memory. Following step S2, the process of step S3 is performed.

In step S3, the CPU 10 performs a display item determination process. The display item determination process is a process of determining a set of selection items (display items) to be displayed from among sets of selection items that can be displayed on the screen. Referred to FIG. 12, the details of the display item determination process will now be described.

Figure 12:
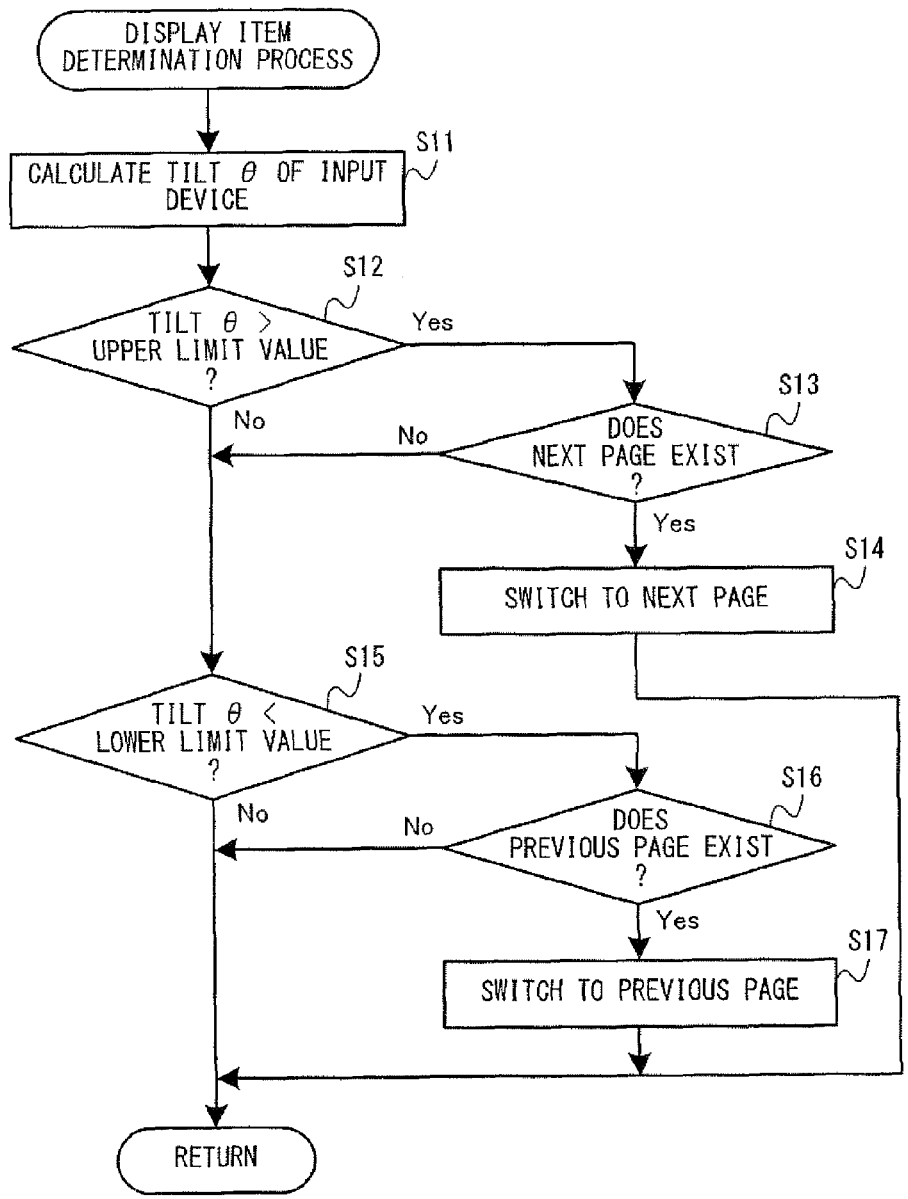
FIG. 12 is a flow chart showing a flow of a display item determination process (step S3) shown in FIG. 11.

FIG. 12 is a flow chart showing a flow of the display item determination process (step S3) shown in FIG. 11. First, in step S11 of the display item determination process, the CPU 10 calculates the tilt angle $\theta$ of the input device 8 about the Z axis. Specifically, the CPU 10 reads out the operation data 71 from the main memory and calculates the tilt angle $\theta$ based on the operation data 71. Data representing the calculated tilt angle $\theta$ is stored in the main memory as the tilt data 78. The method for calculating the tilt angle $\theta$ may be any method such that the calculation is done based on the operation data, and may be, for example, a first calculation method or a second calculation method to be described below.

Figure 13:
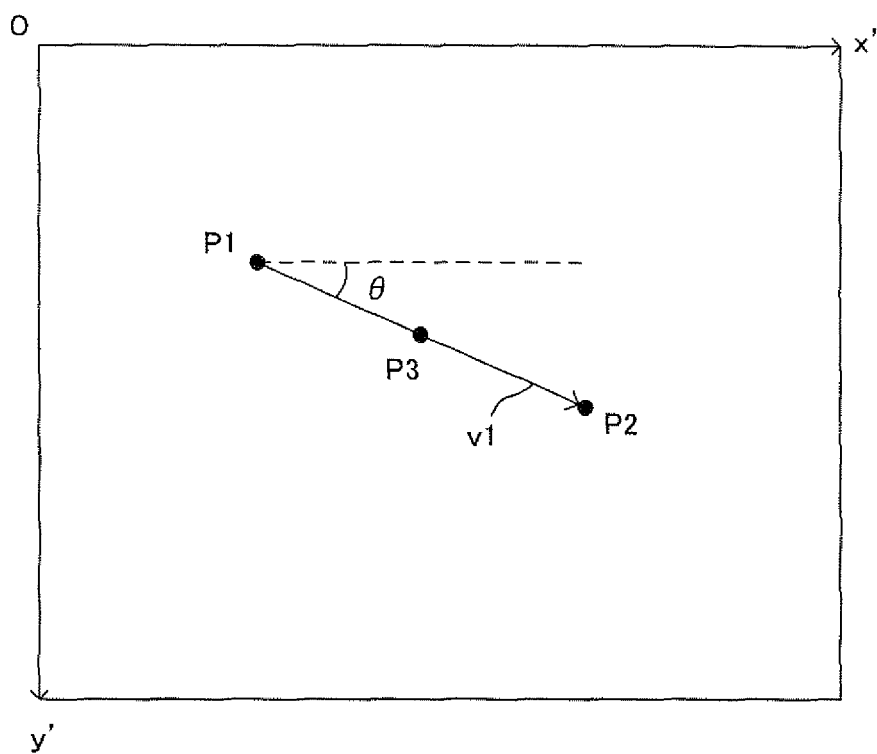
FIG. 13 is a diagram showing an example of positions of marker coordinates in a captured image.

The first calculation method is a method using marker coordinates included in the operation data. FIG. 13 is a diagram showing an example of positions of marker coordinates in a captured image. As shown in FIG. 13, a position on the captured image is expressed by the x'y' coordinate system. In FIG. 13, it is assumed that two sets of marker coordinates representing the positions P1 and P2 are calculated by the image capturing/processing section 35. That is, it is assumed that the game apparatus 3 obtains, as the operation data, data representing marker coordinates representing the positions P1 and P2 shown in FIG. 13 from the controller 5. At this point, the CPU 10 first calculates a vector v1 that connects together the two sets of marker coordinates. Note that it is determined according to a predetermined rule which one of the two sets of marker coordinates is used as the start point of the vector and which one as the end point of the vector. For example, the start point may be one of two sets of marker coordinates of which the value of the x' component is smaller, or a set of marker coordinates that is closer to the set of marker coordinates used as the start point in the previous iteration of step S11.

The angle between the vector v1 and the x' axis changes according to the rotation of the input device 8 about the Z axis, and it is 0° when in the reference orientation (the orientation in which the button surface faces vertically upward). That is, the angle between the vector v1 and the x' axis corresponds to the tilt angle θ of the input device 8. Therefore, the CPU 10 calculates the angle between the vector v1 and the x' axis as the tilt angle θ of the input device. According to the first calculation method described above, it is possible to accurately calculate the tilt angle θ of the input device 8 since an image captured by an image capturing element is used.

The second calculation method is a method using angular velocities included in the operation data. If the tilt of the input device at the initial point is obtained in advance, the CPU 10 can calculate the tilt angle θ of the input device 8 by cumulatively adding successively-detected angular velocities to the tilt at the initial point. Specifically, the tilt angle θ of the input device 8 is calculated as a tilt angle that is obtained by changing the previous tilt (the tilt calculated in the previous process loop) by a unit time worth of the present angular velocity (the angular velocity obtained in the present process loop).

For example, the tilt at the initial point may be obtained as the user performs a predetermined operation (e.g., an operation of pressing the A button 32d) in a state where the input device 8 is at a predetermined tilt. Then, the CPU 10 may use, as the predetermined tilt, the tilt at a point in time when the predetermined operation is performed (the initial point). For example, the tilt at the initial point may be calculated by the first calculation method described above.

In order to obtain the tilt angle θ about the Z axis, the CPU 10 may calculate the tilts about three axes or may calculate only the tilt about the Z axis. That is, the CPU 10 may obtain the tilt angle θ by calculating tilts of the input device 8 about three axes based on (three-dimensional) angular velocities about three axes and then extracting the tilt about the Z axis from the tilts about three axes. The CPU 10 may calculate the tilt angle θ about the Z axis simply based on the angular velocity about the Z axis.

With the first method, it is necessary that the input device 8 is used in a state where the image capturing element 40 can capture an image of the marker section 6 (i.e., in a state where the Z-axis positive direction of the input device 8 faces the marker section 6), thereby restricting the manner in which the input device 8 can be used. In contrast, with the second method, since the tilt angle θ can be calculated without using marker coordinates, the usability of the input device 8 is not restricted, and the user can therefore use the input device 8 while pointing it in any direction.

Note that the method for calculating the tilt angle θ of the input device 8 is not limited to the method above, but may be any other suitable method. For example, in other embodiments, the CPU 10 may calculate the tilt angle θ by using the acceleration included in the operation data. Note that since the acceleration sensor 37 can detect, as an acceleration, the gravitational acceleration acting upon the input device 8, it is possible by using the acceleration to calculate the tilt angle θ of the input device 8 with respect to the direction of gravity. In other embodiments, the first method and the second method may be combined together. Specifically, the tilt angle of the input device 8 calculated by the second method may be corrected by using the tilt angle calculated by the first method (e.g., by bringing the tilt angle calculated by the second method closer to the tilt angle calculated by the first method at a predetermined rate). Moreover, in other embodiments, the CPU 10 may calculate the tilt angle θ by using all of the acceleration, the angular velocity and the marker coordinates.

As described above, the operation data used for calculating the tilt angle of the input device 8 may be marker coordinate data, angular velocity data, acceleration data, or a combination of these data. The operation data may be any data with which the tilt angle of the input device 8 can be calculated. That is, the operation data may be data whose value changes according to the tilt of the input device 8, such as the marker coordinate data and the acceleration data, or data whose value changes according to the change of the tilt of the input device 8, such as the angular velocity data.

Referring back to FIG. 12, following step S11, the process of step S12 is performed. In step S12, the CPU 10 determines whether the tilt angle θ of the input device 8 is larger than the current upper limit value. The "current upper limit value" refers to the upper limit value corresponding to the currently displayed page (the page represented by the page data 79). Specifically, first, the CPU 10 reads out the page data 79 and the threshold value data 80 from the main memory, and identifies the current upper limit value. For example, the current upper limit value is identified to be "θ1°" when the page data 79 represents the first page, and the current upper limit value is identified to be "θ3°" when the page data 79 represents the second page. Note that when the page data 79 represents the third page, no upper limit value is set, and therefore the determination result of step S12 is negative. Then, the CPU 10 reads out the tilt data 78 from the main memory, and determines whether the tilt angle θ represented by the tilt data 78 is larger than the identified current upper limit value. If the determination result of step S12 is affirmative, the process of step S13 is performed. On the other hand, if the determination result of step S12 is negative, the process of step S15 to be described later is performed.

In step S13, the CPU 10 determines whether there exists a next page following the currently displayed page. If the determination result of step S13 is affirmative, the process of step S14 is performed. On the other hand, if the determination result of step S13 is negative, the process of step S15 to be described later is performed. The determination process of step S13 is a process of preventing the page switching process (step S14) from being performed when there is no next page. Note that in the present embodiment, the process of step S13 may be omitted because the upper limit value is not set for the third page for which there is no next page. Note however that it is preferred that the process of step S13 is performed where an upper limit value is set for a page for which there is no next page.

In step S14, the CPU 10 switches the selection items to the next page. Specifically, the CPU 10 reads out the page data 79 from the main memory, and stores data representing a page number obtained by adding one to the page number represented by the page data 79, as new page data 79, in the main memory. Performing step S14 determines the set of display items. After the completion of step S14, the CPU 10 ends the display item determination process.

In step S15, the CPU 10 determines whether the tilt angle θ of the input device 8 is smaller than the current lower limit value. The "current lower limit value" refers to the lower limit value corresponding to the currently displayed page (the page represented by the page data 79). Specifically, first, the CPU 10 reads out the page data 79 and the threshold value data 80 from the main memory, and identifies the current lower limit value. For example, the current lower limit value is identified to be "θ2°" when the page data 79 represents the second page, and the current lower limit value is identified to be "θ4°" when the page data 79 represents the third page. Note that when the page data 79 represents the first page, no lower limit value is set, and therefore the determination result of step S15 is negative. Then, the CPU 10 reads out the tilt data 78 from the main memory, and determines whether the tilt angle θ represented by the tilt data 78 is smaller than the identified current lower limit value. If the determination result of step S15 is affirmative, the process of step S16 is performed. On the other hand, if the determination result of step S15 is negative, the CPU 10 ends the display item determination process.

In step S16, the CPU 10 determines whether there exists a previous page preceding the currently displayed page. If the determination result of step S16 is affirmative, the process of step S17 is performed. On the other hand, if the determination result of step S16 is negative, the CPU 10 ends the display item determination process. The determination process of step S16 is a process of preventing the page switching process (step S17) from being performed when there is no previous page. Note that in the present embodiment, the process of step S16 may be omitted, as is step S13, because the lower limit value is not set for the first page for which there is no previous page. Note however that it is preferred that the process of step S16 is performed where a lower limit value is set for a page for which there is no previous page.

In step S17, the CPU 10 switches the selection items to the previous page. Specifically, the CPU 10 reads out the page data 79 from the main memory, and stores data representing a page number obtained by subtracting 1 from the page number represented by the page data 79, as new page data 79, in the main memory. Performing step S17 determines the display items. After the completion of step S17, the CPU 10 ends the display item determination process.

With the display item determination process described above, the sets of selection items are switched from one to another according to the amount of tilt. That is, the currently displayed page is switched to the next page (step S14) when the tilt angle θ goes above the upper limit value (Yes in step S12) by tilting the input device 8. On the other hand, the currently displayed page is switched to the previous page (step S17) when the tilt angle θ goes below the lower limit value (Yes in step S15) by tilting the input device 8. The currently displayed page remains unchanged if the tilt angle θ of the input device 8 is greater than or equal to the lower limit value and less than or equal to the upper limit value (No in step S12 and No in step S15).

Note that in the above embodiment, upper limit value θ1 of the first page is set to be larger than the lower limit value θ2 of the second page, and the upper limit value θ3 of the second page is set to be larger than the lower limit value θ4 of the third page. Therefore, it is possible to prevent pages from being switched back and forth quickly, thus improving the controllability of the switching operation. The details will now be described with reference to FIGS. 14 and 15.

Figure 14:
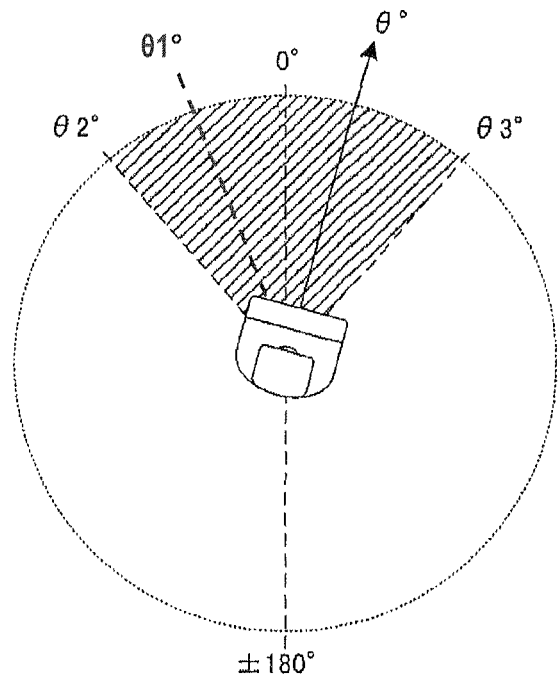
FIG. 14 is a diagram showing the tilt angle θ of the input device and threshold values thereof in a case where a second page is displayed.
Figure 15:
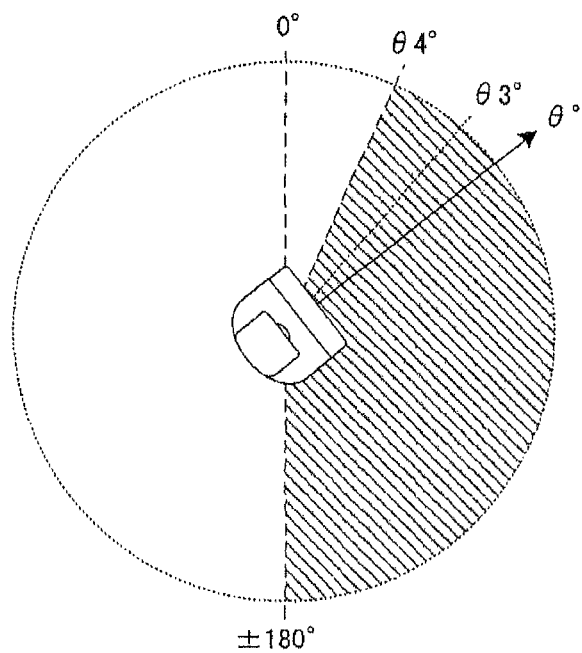
FIG. 15 is a diagram showing the tilt angle θ of the input device and threshold values thereof in a case where a third page is displayed.

FIG. 14 is a diagram showing the tilt angle θ of the input device 8 and threshold values thereof in a case where the second page is displayed. As shown in FIG. 14, where the second page is displayed, the lower limit value is set to θ2° and the upper limit value to θ3°. Therefore, the page is switched to another when the tilt angle θ goes out of the range θ2≤θ≤θ3 (the hatched area shown in FIG. 14). On the other hand, FIG. 15 is a diagram showing the tilt angle θ of the input device 8 and threshold values thereof in a case where the third page is displayed. As shown in FIG. 15, where the third page is displayed, the lower limit value is set to θ4°. Therefore, the page is switched to another when the tilt angle θ goes out of the range θ4≤θ (the hatched area shown in FIG. 15).

Herein, lower limit value θ4 is set to be smaller than the upper limit value θ3 (e.g., θ4=10°, θ3=30°) as described above. Therefore, where the second page is displayed on the screen, the CPU 10 switches the set of selection items displayed on the screen from the second page to the third page on the condition that the tilt angle θ goes above the upper limit value θ3. Where the third page is displayed on the screen, the CPU 10 switches the set of selection items displayed on the screen from the third page to the second page on the condition that the tilt angle θ goes below the lower limit value θ4, which is smaller than the upper limit value θ3. Thus, once the second page is switched to the third page as the value of the tilt angle θ goes above the upper limit value θ3, the page does not return from the third page to the second page even if the tilt angle θ slightly decreases back below θ3 (as long as it does not go below the lower limit value θ4). That is, even if the tilt angle θ of the input device 8 changes back and forth around the upper limit value θ3, it is possible to prevent pages from being switched back and forth quickly between the second page and the third page, thus improving the controllability of the switching operation.

Note that while the switching between the second page and the third page is described as an example in FIGS. 14 and 15, similar advantages can be obtained also for the switching between the first page and the second page by setting the upper limit value θ1 of the first page to be larger than the lower limit value θ2 of the second page.

Referring back to FIG. 11, in step S4 following step S3, the CPU 10 calculates the specified position based on the operation data. Specifically, the CPU 10 reads out the operation data 71 from the main memory, and calculates the specified position based on the operation data 71. Data representing the calculated specified position is stored as the specified position data 77 in the main memory. While the method for calculating the specified position may be any method in which the specified position is calculated based on the operation data, the method may be, for example, a method for calculating the specified position using marker coordinates, or a method for calculating the specified position based on the tilt of the input device 8. Hereinafter, an example of a method for calculating the specified position will be described.

First, referring to FIG. 13, a method for calculating the specified position using marker coordinates will be described. First, the CPU 10 calculates the middle point (the point P3 shown in FIG. 13) between the two marker coordinates from the marker coordinate data 73 included in the operation data 71. Then, the CPU 10 performs a correction of rotating the middle point between the marker coordinates about the center of the captured image so that the vector v1 between the two marker coordinates becomes parallel to the x' axis. With this correction, it is possible to accurately calculate the specified position even if the input device 8 is tilted from the reference orientation about the Z axis of the input device 8. Then, the CPU 10 converts the coordinates representing the position of the corrected middle point to coordinates representing the position on the screen of the television 2. Note that since the specified position of the input device 8 and the position of the middle point in the captured image move in opposite directions, the conversion is performed with up-down inversion and left-right inversion. The position on the screen obtained by this conversion is used as the specified position.

As described above, with the method for calculating the specified position using marker coordinates, it is possible to accurately calculate the specified position, as with the first calculation method for calculating the tilt angle θ of the input device 8.

Figure 16:
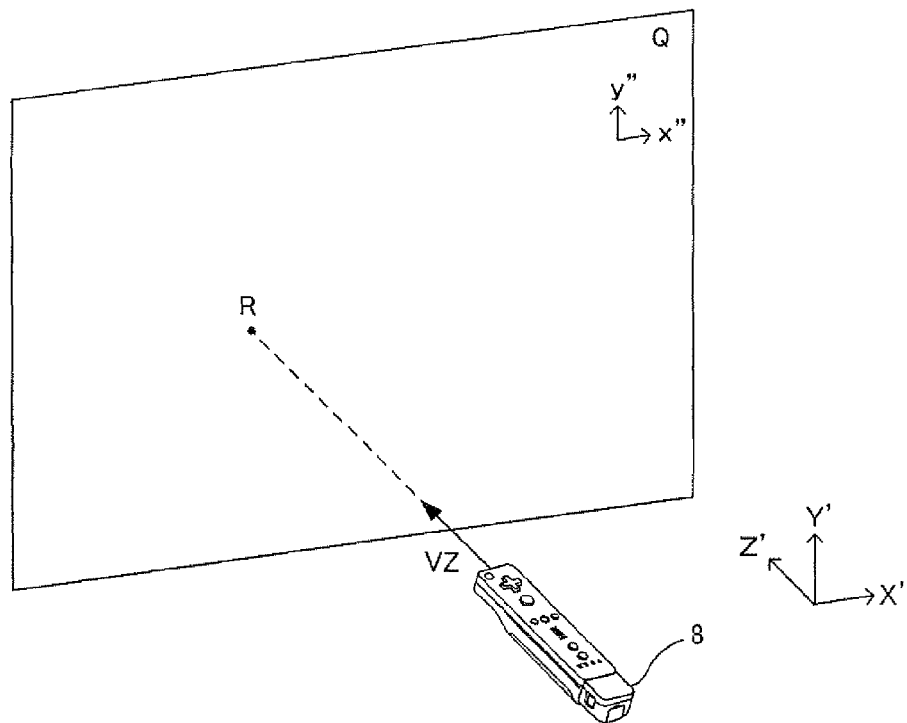
FIG. 16 is a diagram where the input device and a predetermined plane are virtually placed in a predetermined virtual space.

Next, referring to FIGS. 16 and 17, a method for calculating the specified position based on the tilt of the input device 8 will be described. FIG. 16 is a diagram where the input device 8 and a predetermined plane are virtually placed in a predetermined virtual space. In the present embodiment, the CPU 10 calculates the specified position while defining a three-dimensional virtual space and assuming that the input device 8 and a predetermined plane Q are virtually placed therein, as shown in FIG. 16. The plane Q corresponds to the screen of the television 2. The CPU 10 calculates, as the specified position, the position on the plane Q being pointed by the direction of the Z axis of the input device 8 (the Z-axis vector VZ shown in FIG. 16) in the virtual space. That is, the position of the intersection R between a line segment that is obtained by extending the Z-axis vector VZ representing the tilt of the input device 8 in the virtual space and the predetermined plane Q in the virtual space is calculated as the specified position. Note that the "line segment that is obtained by extending the Z-axis vector VZ" means a line segment that is parallel to the Z-axis vector VZ and passes along the Z axis.

Note that in the present embodiment, a position in the virtual space is expressed by the X'Y'Z' coordinate system as shown in FIG. 16. A position on the plane Q is expressed by the x"y" coordinate system. The plane Q is set so as to be parallel to the X'Y' plane of the space coordinate system, and the x"y" coordinate system is set so that the X' axis of the space coordinate system and the x" axis of the plane Q are parallel to each other, and the Y' axis of the space coordinate system and the y" axis of the plane Q are parallel to each other (see FIG. 16).

In the present embodiment, it is assumed that the player uses the input device 8 at a position generally in front of the screen of the television 2 and that the position of the input device 8 does not change in the virtual space. That is, the CPU 10 performs a process by only changing the orientation (tilt) of the input device 8 in the virtual space while not changing the position of the input device 8. Thus, the position on the plane Q (the position of the intersection R) can be uniquely determined from the tilt of the input device 8.

The method for calculating the position on the plane Q (the position of the intersection R) will now be described in detail. FIG. 17 is a diagram showing the virtual space shown in FIG. 16 as viewed from the Y'-axis positive direction side to the negative direction side. In FIG. 17, the length from the point S representing the position of the input device 8 to a point (projected point) T that is obtained by projecting the point S onto the plane Q is denoted as "L". The length, for the x" component, from the projected point T to the intersection R is denoted as "Wx". In the present embodiment, the value of the length L is set by the player at a predetermined point in time (e.g., a point in time when the game process is started).

First, the CPU 10 calculates the Z-axis vector VZ from the tilt of the input device 8. Note that the tilt of the input device 8 can be calculated by a method similar to the second calculation method for calculating the tilt angle θ. Therefore, where the second calculation method is employed for calculating the tilt angle θ of the input device 8, the CPU 10 may store, in advance, the three-dimensional tilt of the input device 8 calculated in step S11 in the main memory, and may calculate the Z-axis vector VZ using the tilt.

Figure 17:
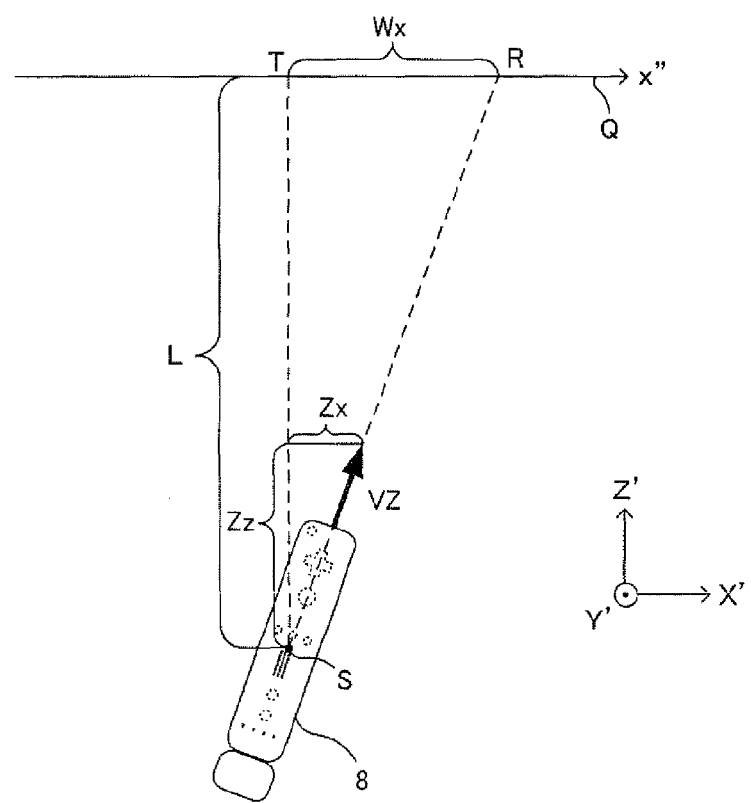
FIG. 17 is a diagram showing the virtual space shown in FIG. 16 as viewed from the Y'-axis positive direction side to the negative direction side.

As is clear from FIG. 17, there is such a relationship that the ratio between the length Wx and the length L is equal to the ratio between the X' component (Zx) of the Z-axis vector VZ and the Z' component (Zz) of the Z-axis vector VZ. Therefore, based on this relationship, the length Wx can be calculated from the known X' component Zx and the known Z' component Zz of the vector VZ and the known length L. That is, the CPU 10 calculates the length Wx by Expression (1) below using the Z-axis vector VZ.

$$Wx = L \times Zx / Zz \quad (1)$$

As is the length Wx of the x" component, the length Wy of the y" component from the projected point T to the intersection R can be calculated by Expression (2) below.

$$Wy = L \times Zy / Zz \quad (2)$$

Once the lengths Wx and Wy are obtained, it is possible to calculate the position of the intersection R on the plane Q. In the present embodiment, the position of the projected point T is used as the origin of the x"y" coordinate system. Then, the coordinates of the intersection R are (Wx,Wy).

After calculating the position of the intersection R, the CPU 10 calculates, as the specified position, the position on the screen corresponding to the position of the intersection R. That is, coordinate values of the x"y" coordinate system are converted to coordinate values of another coordinate system representing the position on the screen. In this conversion, it is preferred that the specified position is calculated so that the specified position is at the center of the screen when the input device 8 is tilted so as to point at the center of the screen. For example, the CPU 10 may perform the conversion so that the position of the projected point T corresponds to the position at the center of the screen. For example, the CPU 10 may determine whether the input device 8 is tilted so as to point at the center of the screen by using marker coordinates, and may perform a conversion so that the calculated position of the intersection R on the plane Q when the input device 8 is so tilted corresponds to the position of the center of the screen.

As described above, it is possible to obtain the specified position from the tilt of the input device 8 by setting a virtual space in which the input device 8 and the predetermined plane Q are placed, and by calculating the position on the plane Q being pointed by the direction of the predetermined axis (the Z axis) of the input device 8 in the virtual space. With the method for calculating the specified position using the tilt of the input device 8, the user can use the input device 8 while pointing it in any direction, as with the second method for calculating the tilt angle θ of the input device 8.

Note that the player is allowed to set the length L in the above embodiment. As is clear from Expressions (1) and (2) above, it is possible to change the value of the two-dimensional coordinates (Wx,Wy) calculated by adjusting the magnitude of the length L. That is, by adjusting the magnitude of the length L, it is possible to adjust the amount of change in the two-dimensional coordinates (Wx,Wy) with respect to the change in the direction of the Z-axis vector VZ (i.e., the change of the tilt of the input device 8). Specifically, the amount of change increases as the value of the length L increases. As a result, the cursor moves by a great distance by only slightly changing the tilt of the input device 8. On the other hand, the amount of change decreases as the value of the length L decreases. As a result, the cursor moves only by a small distance even by significantly changing the tilt of the input device 8. As described above, in the embodiment above, by allowing the player to set the length L, the player can, by themselves, adjust the controllability of the input device 8. For example, the player can set the length L to be relatively small when it is necessary to finely control the cursor, and the player can set the length L to be relatively large when it is necessary to move the cursor by large distances. Note that in other embodiments, the length L may be a predetermined constant.

In other embodiments, the game apparatus 3 may calculate the length L by a predetermined method. For example, the CPU 10 may calculate the actual distance from the input device 8 to the screen of the television 2 to set the calculated distance as the length L. The actual distance may be calculated by, for example, using the length between, or the size of, the two markers 6R and 6L in the captured image captured by the image capturing element 40. Moreover, if the plane Q is set so that the position and size of the plane Q in the virtual space correspond to the position and size of the screen of the television 2 in the actual space (e.g., the player may be allowed to set the size of the screen of the television), the cursor will be displaced at the position on the screen of the television 2 corresponding to two-dimensional coordinates (Wx,Wy). Then, the cursor can be displayed at the accurate position (on the screen) being pointed by the input device 8.

Referring back to FIG. 11, in step S5 following step S4, the CPU 10 displays selection items, etc., on the screen of the television 2. Selection items (letter images) included in the page which is the current display item are displayed on the screen of the television 2, and the cursor is displaced at the specified position calculated in step S4. Specifically, the CPU 10 reads out the specified position data 77 and the page data 79 from the main memory, so as to display selection items of the page specified by the page data 79 on the screen and display the cursor at the specified position specified by the specified position data 77. Following step S5, the process of step S6 is performed.

If the page specified by the page data 79 has been changed from that in the previous process loop, the set of selection items (letter images) displayed is switched to another in step S5. Note that the specific display process for switching between sets of selection items may be any process. In the present embodiment, the display process is performed by using a virtual camera. That is, the CPU 10 sets the position and the direction of the virtual camera so that one of the pages placed in the virtual space that is specified by the page data 79 corresponds to the display range, and produces an image of each page as viewed from the virtual camera to display the produced image on the screen. Note that in other embodiments, the CPU 10 may move the page, being the display items, instead of moving the virtual camera. In other embodiments, the display process may be performed by a method in which the virtual camera is not used. For example, the CPU 10 may set the display range on the two-dimensional plane in which each page is placed, so that pages are switched from one to another by switching the display range from one to another.

Figure 18:
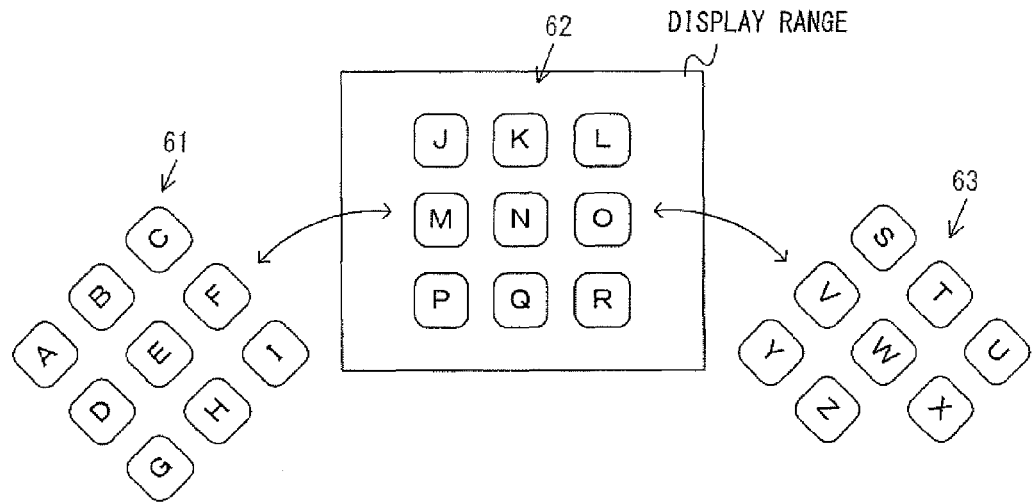
FIG. 18 is a diagram showing an example of a method for switching between sets of selection items.

The visual effect used when switching between sets of selection items (pages) may be any visual effect. For example, when a page is switched to another, the CPU 10 may switch from the current page to the new page with a scrolling visual effect. FIG. 18 is a diagram showing an example of a method for switching between sets of selection items. In FIG. 18, the set of letter images 61 representing "A" to "I", the set of letter images 62 representing "J" to "R", and the set of letter images 63 representing "S" to "Z" are placed in the virtual space along an arc. When switching pages from one to another, the CPU 10 rotates and moves the virtual camera so that the display range gradually changes from the position of the current page to the position of the new page (see arrows shown in FIG. 18). Note that the CPU 10 may rotate the letter images 61 to 63 instead of rotating the virtual camera. As described above, in the present embodiment, sets of selection items are switched from one to another with such a visual effect in which selection items are scrolled with rotation, as shown in FIG. 18. Note that in other embodiments, the CPU 10 may scroll the image so that the display area is simply moved straight in the vertical or horizontal direction. While the image scroll direction may be any direction, it is preferred that the image is moved in the horizontal direction (including the case where it is moved straight in the horizontal direction, and the case where it is moved in the horizontal direction with rotation as shown in FIG. 18). This is because the user is then given a natural controlling feel, with the direction in which the input device 8 is tilted being coincident with the direction in which the image moves.

Note that in example embodiments of the present invention, since the CPU 10 "switches" between sets of selection items according to the amount of tilt of the input device 8, the scrolling of the image will not stop on the way during the switching. In the embodiment above, the CPU 10 uses a transitional visual effect, when switching between pages, in which the image transitions (scrolls) gradually. In other embodiments, the CPU 10 may transition the image discontinuously (i.e., simply switch the image to another) without such a transitional visual effect.

In step S6, the CPU 10 performs a predetermined process using the specified position. In the present embodiment, the predetermined process is a process of outputting (displaying) a letter represented by the letter image being pointed by the cursor. That is, when a predetermined operation (e.g., an operation of pressing the A button 32d of the input device 8) is performed with a letter image being pointed by the cursor, the CPU 10 outputs a letter represented by the letter image. Note that the predetermined process may be any process as long as it is an information process in accordance with an item selected while being displayed at the specified position. For example, where an icon representing an item in a game is displayed as a selection item, the CPU 10 may perform, as the predetermined process, a process of using the item represented by the icon displayed at the specified position in the game. Where an image representing a game character is displayed as a selection item, for example, the CPU 10 may perform, as the predetermined process, a process of determining the game character displayed at the specified position as an object to be controlled by the user. Following step S6, the process of step S7 is performed.

In step S7, the CPU 10 determines whether the letter input process should be ended. The determination of step S7 is made based on, for example, whether the player has given an instruction to end the letter input process. If the determination result of step S7 is negative, the process of step S2 is performed again. Thereafter, the process loop through steps S2 to S7 is performed repeatedly until it is determined in step S7 that the process should be ended. If the determination result of step S7 is affirmative, the CPU 10 ends the letter input process shown in FIG. 11. The letter input process is as described above.

As described above, in the embodiment above, the set of selection items displayed on the screen is switched to another according to the tilt angle θ of the input device 8, and one of the selection items is selected according to the specified position of the input device 8. Therefore, the user performs the operation of selecting a selection item and the operation of switching between sets of selection items. Thus, it is possible to reduce the number of selection items displayed at once, and to perform two different operations using one input device 8. Therefore, according to example embodiments of the present invention, the user can easily perform the operation of selecting an item from among selection items.

In a conventional method where all the selection items are displayed at once, each selection item is shown to be small, thereby requiring the user to more accurately control the cursor (specified position). Therefore, it is practically impossible for the user to remember the direction of the input device 8 (specified position) and the selection items, and to perform an input operation without visually checking the position of the cursor. In contrast, according to the present embodiment, each selection item displayed on the screen can be made larger than that in the conventional method, thereby not requiring the user to so accurately control the cursor. Therefore, if the user is somewhat used to the control, the user can perform an input operation, remembering the selection items for the combination of the specified position and the tilt angle. Therefore, according to the present embodiment, it is possible to perform an input operation more quickly than that in the prior art.

In the embodiment above, the specified position used for selecting a selection item is calculated according to the tilt of the input device 8 about the X axis and that about the Y axis (it can be said to be "the movement in the X-axis direction and the Y-axis direction" assuming that the input device 8 is used while the Z axis thereof is facing the marker section 6). On the other hand, the tilt angle θ used for switching between sets of selection items is a tilt about the Z axis of the input device 8. Thus, in the embodiment above, the specified position is calculated according to the tilt or the position about an axis perpendicular to the Z axis used for the calculation of the tilt angle θ. In this way, the operation of selecting a selection item and the operation of switching between selection items are independent of each other and do not influence each other, thereby making it easy for the user to perform the two different operations.

[Variation]

The embodiment above is merely an example, and the present invention may also be carried out with the following configurations in other embodiments.

(Variation with Respect to Game System)

Figure 19:
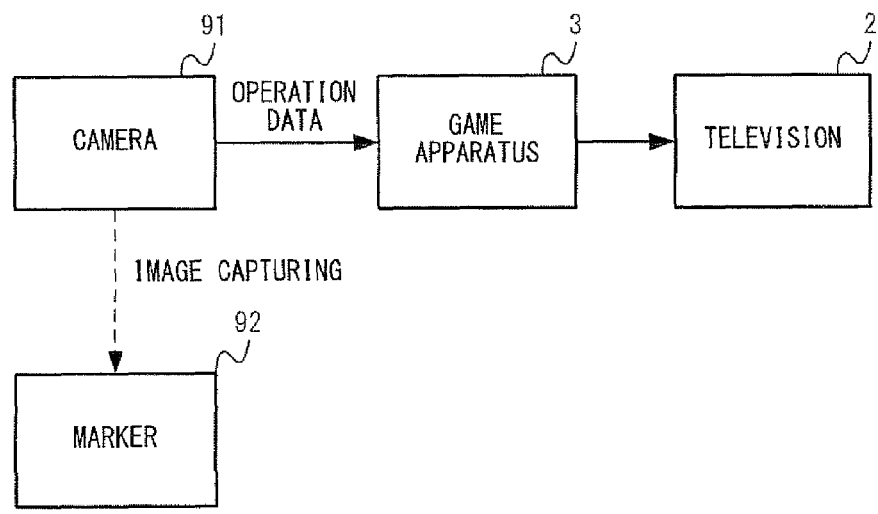
FIG. 19 is a block diagram showing a configuration of a game system of a first variation.
Figure 20:
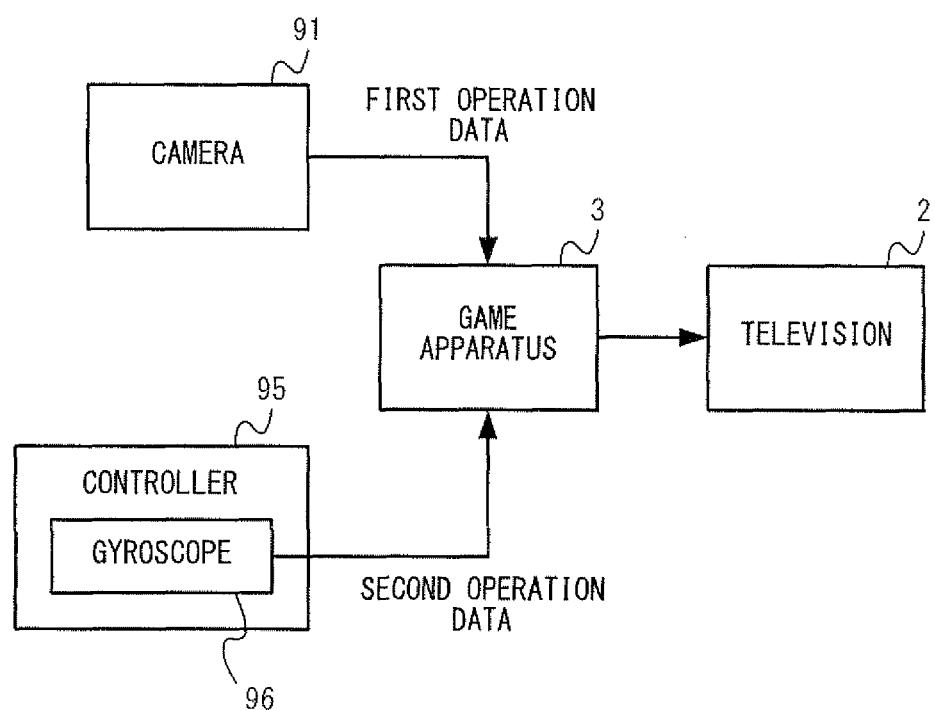
FIG. 20 is a block diagram showing a configuration of a game system of a second variation.

Referring to FIGS. 19 and 20, an example of a game system in another embodiment will now be described. FIG. 19 is a block diagram showing a configuration of a game system of a first variation. In FIG. 19, the game system includes a camera 91, the game apparatus 3, and the television 2. While the game apparatus 3 may employ a similar configuration to that of the embodiment above, the process of calculating the tilt angle, etc., are different from those of the embodiment above. The television 2 has a similar configuration to that of the embodiment above. The game system shown in FIG. 19 will now be described while focusing primarily on what is different from the embodiment above.

A marker 92 is an object of which the image is captured by the camera 91. Where the game system includes a controller to be held by the user, the controller may be used as the marker 92. Alternatively, a part of the body of the user (e.g., a hand) may be used in place of the marker 92. The camera 91 is placed at any position (e.g., a position around the television 2) and captures the image of the marker 92. The operation data based on the image-capturing result of the camera 91 is transmitted to the game apparatus 3 via a wired or wireless connection. The "operation data based on the image-capturing result" may be data of the captured image, or data representing information that can be obtained from the image data (e.g., information of the position, the direction or the shape of the marker 92 in the captured image).

The game apparatus 3 calculates the tilt angle of the marker 92 based on the operation data. The tilt angle of the marker 92 can be obtained by, for example, identifying the shape of the marker 92 in the captured image and calculating the direction of the marker 92 from the shape. The game apparatus 3 calculates the specified position specified by the marker 92 based on the operation data. The specified position can be calculated from the position of the marker 92 in the captured image, for example. Thus, it is possible to calculate the tilt angle and the specified position of the marker 92 based on the image-capturing result of the marker 92. Note that the process after the process of using the tilt angle and the specified position is similar to that of the embodiment above.

As shown in FIG. 19, in other embodiments, the object controlled by the user is not limited to the input device 8, but may be a part of the body of the user, or a marker that can be moved by the user. Then, the game apparatus 3 obtains, as the operation data, data based on the image-capturing result from the image capturing means for capturing the image of the object. Also in this way, as in the embodiment above, it is possible to calculate the tilt angle and the specified position of the object controlled by the user based on the operation data, and the user can perform an operation of selecting a selection item using the tilt angle and the specified position as inputs.

FIG. 20 is a block diagram showing a configuration of a game system of a second variation. In FIG. 20, the game system includes the camera 91, a controller 95, the game apparatus 3, and the television 2. While the game apparatus 3 may employ a similar configuration to that of the embodiment above, the process of calculating the tilt angle, etc., are different from those of the embodiment above. The television 2 has a similar configuration to that of the embodiment above. The game system shown in FIG. 20 will now be described while focusing primarily on what is different from the embodiment above.

The camera 91 is the same as that of the first variation. In the second variation, the operation data based on the image-capturing result of the camera 91 is referred to as the "first operation data". The controller 95 includes detection means capable of detecting information regarding the tilt of itself. In FIG. 20, the detection means is a gyroscope 96. The gyroscope 96 may detect only an angular velocity about one axis, or may detect angular velocities about two axes or three axes. The detection means included in the controller 95 may be the acceleration sensor 37 of the embodiment above, or may be image capturing means capturing the image of a marker section (where the game system includes a marker section). The controller 95 transmits data based on the detection result of the gyroscope 96 as second operation data to the game apparatus 3 via a wired or wireless connection.

In the second variation, the game apparatus 3 calculates the tilt angle of the controller 95 based on the second operation data. The method for calculating the tilt angle based on the second operation data, i.e., the method for calculating the tilt angle based on the detection result of the gyroscope 96, is similar to that of the embodiment above. On the other hand, the game apparatus 3 calculates the specified position specified by the controller 95 based on the first operation data. The method for calculating the specified position is similar to that of the first variation. Note that the process after the process of using the tilt angle and the specified position is similar to that of the embodiment above.

As shown in FIG. 20, in other embodiments, the controller 95 including the gyroscope 96 may be used as the object controlled by the user. In this case, the game apparatus 3 may calculate the tilt angle of the controller 95 based on the second operation data from the controller 95, and calculate the specified position based on the first operation data from the camera 91 (being a separate unit from the controller 95). Also in this manner, as in the embodiment above and the first variation, it is possible to calculate the tilt angle and the specified position of the object controlled by the user based on the operation data, and the user can perform an operation of selecting a selection item by using the tilt angle and the specified position as inputs.

In other embodiments, the game apparatus 3 may calculate the specified position specified by the controller based on the operation data from the controller, and calculate the tilt angle of the controller based on the operation data from a camera being a separate unit from the controller. As described above, example embodiments of the present invention are applicable to any information processing system that is capable of calculating the tilt angle of the object controlled by the user and the specified position specified by the object.

(Variation with Respect to Selection Items Displayed on Screen)

While images representing letters (alphabet letters) are displayed as selection items on the screen in the embodiment above, the selection items are not limited thereto. For example, in other embodiments, selection items may be icons each associated with a particular process. That is, example embodiments of the present invention are applicable to a technique in which a plurality of icons is displayed, and when an icon is selected, a process associated with the icon is performed. Example embodiments of the present invention are also applicable to a game process. That is, the game apparatus 3 may display, as selection items on the screen, images each representing a game item or a game character, or images each representing a game command. Then, the game apparatus performs a game process corresponding to the item or the game character represented by the selected image, and performs a game process corresponding to the command represented by the selected image. As described above, the selection items may be images each associated with a particular process.

Example embodiments of the present invention are also applicable to a process of displaying a map (or a game map). Specifically, the game apparatus 3 switches between maps to be displayed on the screen according to the tilt angle θ of the input device 8. Note that a partial area (or a point) in the map area is associated with a particular process (e.g., a process of registering the partial area, a process of displaying the vicinity of the partial area on an enlarged scale, etc.). When a partial area is selected, the game apparatus 3 performs a process that is associated with the selected partial area (the partial area corresponding to the specified position). In this way, example embodiments of the present invention can be applied to a case where a map is displayed on the screen, and a process is performed on a point on the map.

While sets of letters are switched from one to another in response to a selection item switching operation in the embodiment above, types of letters may be switched from one to another in response to a selection item switching operation. That is, in the embodiment above, 26 alphabet letters are divided into three groups, and the displayed group is switched from one to another in response to a selection item switching operation. Alternatively, in other embodiments, switching between capital letters and small letters, switching between hiragana (Japanese cursive alphabet) and katakana (Japanese square alphabet), or switching between fonts of letters may be actuated in response to a selection item switching operation.

As described above, example embodiments of the present invention are applicable as an information processing program, or the like, for performing a game process, a letter input process, or the like, for example, aiming at, for example, providing an input interface that allows for an easy operation of selecting an item from among selection items.

While example embodiments of the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an information processing program to be executed by a computer in an information processing apparatus capable of obtaining operation data according to a tilt of a predetermined object that can be moved by a user, the information processing program causing the computer to provide functionality comprising:
    a tilt calculation for calculating, based on the operation data, tilt information corresponding to the tilt of the object about a predetermined axis of the object;
    a position calculation for calculating a specified position on a screen of a display device based on the operation data so that the specified position changes according to a direction of the predetermined axis of the object and calculating the specified position according to a tilt of the object about a first axis and a tilt thereof about a second axis perpendicular to the first axis, or according to a movement in a direction of the first axis and a movement in a direction of the second axis, the first and second axes being perpendicular to the predetermined axis of the object;
    a display control for displaying one of partial sub-groups of selection items on the screen of the display device;
    a switching for switching one of a plurality of partial sub-groups of selection items displayed on the screen to another according to an amount of tilt about the predetermined axis, the amount of tilt changing independently of a direction of the predetermined axis, which is used for calculating the specified position; and
    a selection for selecting one item displayed at the specified position, which changes according to the direction of the predetermined axis and which changes according to the tilt of the object about the first axis and the tilt thereof about the second axis or according to the movement in the direction of the first axis and the movement in the direction of the second axis, from among the partial sub-group of selection items, to which switching has been made according to the amount of tilt, which changes independently of the direction of the predetermined axis, to perform an information process according to the selected item;
    wherein where a first partial sub-group of selection items is displayed on the screen, the switching switches the selection items displayed on the screen from the first partial sub-group of selection items to a second partial sub-group of selection items on a condition that the amount of tilt about the predetermined axis goes above a first threshold value, and where the second partial sub-group of selection items is displayed on the screen, the switching switches the selection items displayed on the screen from the second partial sub-group of selection items to the first partial sub-group of selection items on a condition that the amount of tilt about the predetermined axis goes below a second threshold value being smaller than the first threshold value.

2. The non-transitory storage medium according to claim 1, wherein:
    the object is an input device including a detector capable of detecting a tilt of itself or information according to a change of the tilt;
    the tilt calculation calculates the tilt information by using data based on a detection result of the detector as the operation data; and
    the position calculation calculates the specified position by using data based on a detection result of the detector as the operation data.

3. The non-transitory storage medium according to claim 2, wherein
    the detector is a gyroscope for detecting an angular velocity of the object;
    the tilt calculation calculates the tilt information based on the angular velocity detected by the gyroscope; and the position calculation calculates a position of an intersection between a line segment extended from a predetermined position in a predetermined space in a direction of a vector corresponding to a tilt represented by the tilt information and a predetermined plane in the predetermined space, so as to calculate, as the specified position, a position on the screen corresponding to the position of the intersection.

4. The non-transitory storage medium according to claim 2, wherein:
the detector is an image capture device configured to capture an image of a predetermined subject;
the tilt calculation calculates the tilt information based on a tilt of the subject in the captured image captured by the image capture device; and
the position calculation calculates the specified position based on a position of the subject in the captured image captured by the image capture device.

5. The non-transitory storage medium according to claim 1, wherein:
the object is a part of a body of the user or a marker that can be used by the user; and
the information processing apparatus obtains, as the operation data, data based on an image-capturing result from image capture device capturing an image of the object.

6. The non-transitory storage medium according to claim 1, wherein:
the object is an input device including a detector capable of detecting a tilt of itself or information according to a change of the tilt;
the information processing apparatus obtains, as the operation data, data based on an image-capturing result from image capture device capturing an image of the object, and obtains, as the operation data, data based on a detection result of the detector from the input device;
the tilt calculation calculates the tilt information based on the data based on the detection result; and
the position calculation calculates the specified position based on the data based on the image-capturing result.

7. The non-transitory storage medium according to claim 1, wherein:
the display control displays, on the screen, a part of a predetermined plane on which sets of the selection items are placed along an arc; and
the switching switches between sets of the selection items displayed on the screen by rotating the predetermined plane.

8. The non-transitory storage medium according to claim 1, wherein:
the selection items are images displayed on the screen, each image being associated with a process; and
the selection includes performance of a process associated with the image displayed at the specified position.

9. The non-transitory storage medium according to claim 8, wherein:
the selection items are each an image representing a game item, a game character, or a game command; and
the selection includes performance of a game process according to an item, a game character or a game command represented by the image displayed at the specified position.

10. The non-transitory storage medium according to claim 8, wherein:
the selection items are each an image representing a letter or a string of letters; and
the selection includes performance of a process of outputting a letter represented by the image displayed at the specified position.

11. The non-transitory storage medium according to claim 10, wherein the switching switches between letter types of the letter or the string of letters represented by the image displayed on the screen.

12. The non-transitory storage medium according to claim 1, wherein:
the selection items are each a partial area in an area displayed on the screen, each partial area being associated with a process; and
the selection includes performance of a process associated with a partial area corresponding to the specified position.

13. The storage medium according to claim 1, wherein: the position calculation calculates a position of an intersection between a line segment extended from a predetermined position in a predetermined space in a direction of a vector corresponding to a tilt represented by the tilt information and a predetermined plane in the predetermined space, so as to calculate, as the specified position, a position on the screen corresponding to the position of the intersection.

14. The storage medium according to claim 1, wherein: the operation data used as a basis for calculating the specified position on the screen of the display device so that the specified position changes according to the direction of the predetermined axis is obtained simultaneously with the operation data used as a basis to calculate the tilt information of the amount of tilt about the predetermined axis for switching between the partial sub-groups of selection items displayed on the screen.

15. The non-transitory storage medium according to claim 1, wherein the predetermined axis is the longitudinal axis of the predetermined object.

16. An information processing apparatus capable of obtaining operation data according to a tilt of a predetermined object that can be moved by a user, comprising:
a computer system, comprising a computer processor, the computer system being configured to at least perform:
a tilt calculation for calculating, based on the operation data, tilt information corresponding to the tilt of the object about a predetermined axis of the object;
a position calculation for calculating a specified position on a screen of a display device based on the operation data so that the specified position changes according to a direction of the predetermined axis of the object and calculating the specified position according to a tilt of the object about a first axis and a tilt thereof about a second axis perpendicular to the first axis, or according to a movement in a direction of the first axis and a movement in a direction of the second axis, the first and second axes being perpendicular to the predetermined axis of the object;
a display control for displaying one of partial sub-groups of selection items on the screen of the display device;
a switching for switching one of a plurality of partial sub-groups of selection items displayed on the screen to another according to an amount of tilt about the predetermined axis, the amount of tilt changing independently of a direction of the predetermined axis, which is used for calculating the specified position; and
a selection for selecting one item displayed at the specified position, which changes according to the direction of the predetermined axis and which changes according to the tilt of the object about the first axis and the tilt thereof about the second axis or according to the movement in the direction of the first axis and the movement in the direction of the second axis, from among the partial sub-group of the selection items, to which switching has been made according to the amount of tilt, which changes independently of the direction of the predetermined axis, to perform an information process according to the selected item;

wherein where a first partial sub-group of selection items is displayed on the screen, the switching switches the selection items displayed on the screen from the first partial sub-group of selection items to a second partial sub-group of selection items on a condition that the amount of tilt about the predetermined axis goes above a first threshold value, and where the second partial sub-group of selection items is displayed on the screen, the switching switches the selection items displayed on the screen from the second partial sub-group of selection items to the first partial sub-group of selection items on a condition that the amount of tilt about the predetermined axis goes below second threshold value being smaller than the first threshold value.

17. The information processing apparatus according to claim 16, wherein: the position calculation calculates a position of an intersection between a line segment extended from a predetermined position in a predetermined space in a direction of a vector corresponding to a tilt represented by the tilt information and a predetermined plane in the predetermined space, so as to calculate, as the specified position, a position on the screen corresponding to the position of the intersection.

18. The information processing apparatus according to claim 16, wherein: the operation data used as a basis for calculating the specified position on the screen of the display device so that the specified position changes according to the direction of the predetermined axis is obtained simultaneously with the operation data used as a basis to calculate the tilt information of the amount of tilt about the predetermined axis for switching between the partial sub-groups of selection items displayed on the screen.

19. The information processing apparatus according to claim 16, wherein the predetermined axis is the longitudinal axis of the predetermined object.

20. An information processing system capable of obtaining operation data according to a tilt of a predetermined object that can be moved by a user, comprising:
a computer system, comprising a computer processor, the computer system being configured to at least:
calculate, based on the operation data, tilt information corresponding to the tilt of the object about a predetermined axis of the object;
calculate a specified position on a screen of a display device based on the operation data so that the specified position changes according to a direction of the predetermined axis of the object and calculate the specified position according to a tilt of the object about a first axis and a tilt thereof about a second axis perpendicular to the first axis, or according to a movement in a direction of the first axis and a movement in a direction of the second axis, the first and second axes being perpendicular to the predetermined axis of the object;
control display of one of partial sub-groups of selection items on the screen of the display device;
switch one of a plurality of partial sub-groups of selection items displayed on the screen to another according to an amount of tilt about the predetermined axis, the amount of tilt changing independently of a direction of the predetermined axis, which is used for calculating the specified position; and
select one item displayed at the specified position, which changes according to the direction of the predetermined axis and which changes according to the tilt of the object about the first axis and the tilt thereof about the second axis or according to the movement in the direction of the first axis and the movement in the direction of the second axis, from among the partial sub-group of selection items, to which switching has been made according to the amount of tilt, which changes independently of the direction of the predetermined axis, to perform an information process according to the selected item;

wherein where a first partial sub-group of selection items is displayed on the screen, the selection items displayed on the screen is switched from the first partial sub-group of selection items to a second partial sub-group of selection items on a condition that the amount of tilt about the predetermined axis goes above a first threshold value, and where the second partial sub-group of selection items is displayed on the screen, the selection items displayed on the screen is switched from the second partial sub-group of selection item to the first partial sub-group of selection items on a condition that the amount of tilt about the predetermined axis goes below a second threshold value being smaller than the first threshold value.

21. The information processing system according to claim 20, wherein: the computer system is further configured to at least: calculate a position of an intersection between a line segment extended from a predetermined position in a predetermined space in a direction of a vector corresponding to a tilt represented by the tilt information and a predetermined plane in the predetermined space, so as to calculate, as the specified position, a position on the screen corresponding to the position of the intersection.

22. The information processing system according to claim 20, wherein: the operation data used as a basis for calculating the specified position on the screen of the display device so that the specified position changes according to the direction of the predetermined axis is obtained simultaneously with the operation data used as a basis to calculate the tilt information of the amount of tilt about the predetermined axis for switching between the partial sub-groups of selection items displayed on the screen.

23. The information processing system according to claim 20, wherein the predetermined axis is the longitudinal axis of the predetermined object.

24. An information processing apparatus capable of obtaining operation data according to a tilt of a predetermined object that can be moved by a user, comprising:
a tilt calculator configured to calculate, based on the operation data, tilt information corresponding to the tilt of the object about a predetermined axis of the object;
a position calculator configured to calculate a specified position on a screen of a display device based on the operation data so that the specified position changes according to a direction of the predetermined axis of the object and calculate the specified position according to a tilt of the object about a first axis and a tilt thereof about a second axis perpendicular to the first axis, or according to a movement in a direction of the first axis and a movement in a direction of the second axis, the first and second axes being perpendicular to the predetermined axis of the object;

a display controller configured to display one of partial sub-groups of selection items on the screen of the display device;

a data table configured to at least assign a first partial sub-group of the selection items to a first tilt range of the object and assign a second partial sub-group of the selection items to a second tilt range of the object;

a switching device configured to switch one of the partial sub-groups of the selection items displayed on the screen to another according to an amount of tilt about the predetermined axis, the amount of tilt changing independently of a direction of the predetermined axis, which is used for calculating the specified position, so that the first partial sub-group of the selection items is displayed upon the amount of tilt being within the first tilt range and the second partial sub-group of the selection items is displayed upon the amount of tilt being within the second tilt range; and a selector configured to select one item displayed at the specified position, which changes according to the direction of the predetermined axis and which changes according to the tilt of the object about the first axis and the tilt thereof about the second axis or according to the movement in the direction of the first axis and the movement in the direction of the second axis, from among the partial sub-group of selection items, to which switching has been made according to the amount of tilt, which changes independently of the direction of the predetermined axis, to perform an information process according to the selected item;

wherein where the first partial sub-group of selection items is displayed on the screen, the switching device switches the selection items displayed on the screen from the first partial sub-group of selection items to the second partial sub-group of selection items on a condition that the amount of tilt passes a second threshold and goes above a first threshold value, and where the second partial sub-group of selection items is displayed on the screen, the switching device switches the selection items displayed on the screen from the second partial sub-group of selection items to the first partial sub-group of selection items on a condition that the amount of tilt goes below the second threshold value being smaller than the first threshold value.

25. The information processing apparatus according to claim 24, wherein the predetermined axis is the longitudinal axis of the predetermined object.

26. An information processing apparatus capable of obtaining operation data according to a tilt of a predetermined object that can be moved by a user, comprising:

a tilt calculator configured to calculate, based on the operation data, tilt information corresponding to the tilt of the object about a predetermined axis of the object;

a position calculator configured to calculate a specified position on a screen of a display device based on the operation data so that the specified position changes according to a direction of the predetermined axis of the object and calculate the specified position according to a tilt of the object about a first axis and a tilt thereof about a second axis perpendicular to the first axis, or according to a movement in a direction of the first axis and a movement in a direction of the second axis, the first and second axes being perpendicular to the predetermined axis of the object;

a display controller configured to display one of partial sub-groups of selection items on the screen of the display device;

a data table configured to at least assign a first partial sub-group of the selection items to a first tilt range of the object and assign a second partial sub-group of the selection items to a second tilt range of the object;

a switching device configured to switch one of the partial sub-groups of the selection items displayed on the screen to another according to an amount of tilt about the predetermined axis, the amount of tilt changing independently of a direction of the predetermined axis, which is used for calculating the specified position, so that the first partial sub-group of the selection items is displayed upon the amount of tilt being within the first tilt range and the second partial sub-group of the selection items is displayed upon the amount of tilt being within the second tilt range; and a selector configured to select one item displayed at the specified position, which changes according to the direction of the predetermined axis and which changes according to the tilt of the object about the first axis and the tilt thereof about the second axis or according to the movement in the direction of the first axis and the movement in the direction of the second axis, from among the partial sub-group of selection items, to which switching has been made according to the amount of tilt, which changes independently of the direction of the predetermined axis, to perform an information process according to the selected item;

wherein where the first partial sub-group of selection items is displayed on the screen, the switching device switches the selection items displayed on the screen from the first partial sub-group of selection items to the second partial sub-group of selection items on a condition that the amount of tilt goes above a first threshold value, and where the second partial sub-group of selection items is displayed on the screen, the switching device switches the selection items displayed on the screen form the second partial sub-group of selection items to the first partial sub-group of selection items on a condition that the amount of tilt goes below the second threshold value being smaller than the first threshold vale, and the first and second thresholds corresponding to tilts on the same side of a reference orientation corresponding to a zero amount of tilt.

* * * * *